United States Patent [19]

Mori

[11] Patent Number: 5,717,722
[45] Date of Patent: Feb. 10, 1998

[54] PRECISION SYMBOL DEMODULATION SYSTEM FOR MULTI-CARRIER MODULATION SIGNAL

[75] Inventor: Takashi Mori, Atsugi, Japan

[73] Assignee: Anritsu Corporation, Tokyo, Japan

[21] Appl. No.: 552,877

[22] Filed: Nov. 3, 1995

[30] Foreign Application Priority Data

| Nov. 8, 1994 | [JP] | Japan | 6-273835 |
| Nov. 8, 1994 | [JP] | Japan | 6-273836 |
| Nov. 8, 1994 | [JP] | Japan | 6-273837 |

[51] Int. Cl.$^6$ .................................................. H04L 27/14
[52] U.S. Cl. .................... 375/326; 375/261; 329/304; 329/306
[58] Field of Search ........................ 375/324, 326, 375/219, 261; 329/304, 306

[56] References Cited

U.S. PATENT DOCUMENTS

| 3,835,404 | 9/1974 | Nakamura et al. | 375/326 |
| 4,039,961 | 8/1977 | Ishio et al. | 329/304 |
| 4,584,534 | 4/1986 | Lijphart et al. | 375/326 |
| 5,243,629 | 9/1993 | Wei | 375/326 |
| 5,600,672 | 2/1997 | Oshima et al. | 375/219 |

FOREIGN PATENT DOCUMENTS

| 6-30070 | 2/1994 | Japan. |
| 6-112987 | 4/1994 | Japan. |

OTHER PUBLICATIONS

Digital MCA System RCR Standard STD-32, pp. 1-30; Research & Development Center for Radio System (in Japan), published on Mar. 17, 1993.

*Primary Examiner*—Wellington Chin
*Assistant Examiner*—Congvan Tran
*Attorney, Agent, or Firm*—Frishauf, Holtz, Goodman, Langer & Chick

[57] ABSTRACT

When a signal modulated by a multi-subcarrier modulation scheme is to be demodulated, an amplitude detection unit sequentially detects the amplitudes of a subcarrier-synthesized signal to accurately set a symbol discrimination timing for the modulated signal within a short period of time. A reference amplitude storage unit stores a reference amplitude at a portion corresponding to a predetermined reference symbol portion included in the received signal. A correlation calculation unit sequentially calculates correlation values between amplitudes sequentially detected by the amplitude detection unit and the reference amplitude. A discrimination timing determination unit determines a symbol discrimination timing on the basis of time representing a maximum value of the correlation values sequentially calculated by the correlation calculation unit. When the signal modulated by the multi-subcarrier modulation scheme is to be demodulated, a phase detection unit detects a phase θ of the subcarrier-synthesized signal at a predetermined portion to easily and properly correct the frequency offset of a carrier frequency.

21 Claims, 23 Drawing Sheets

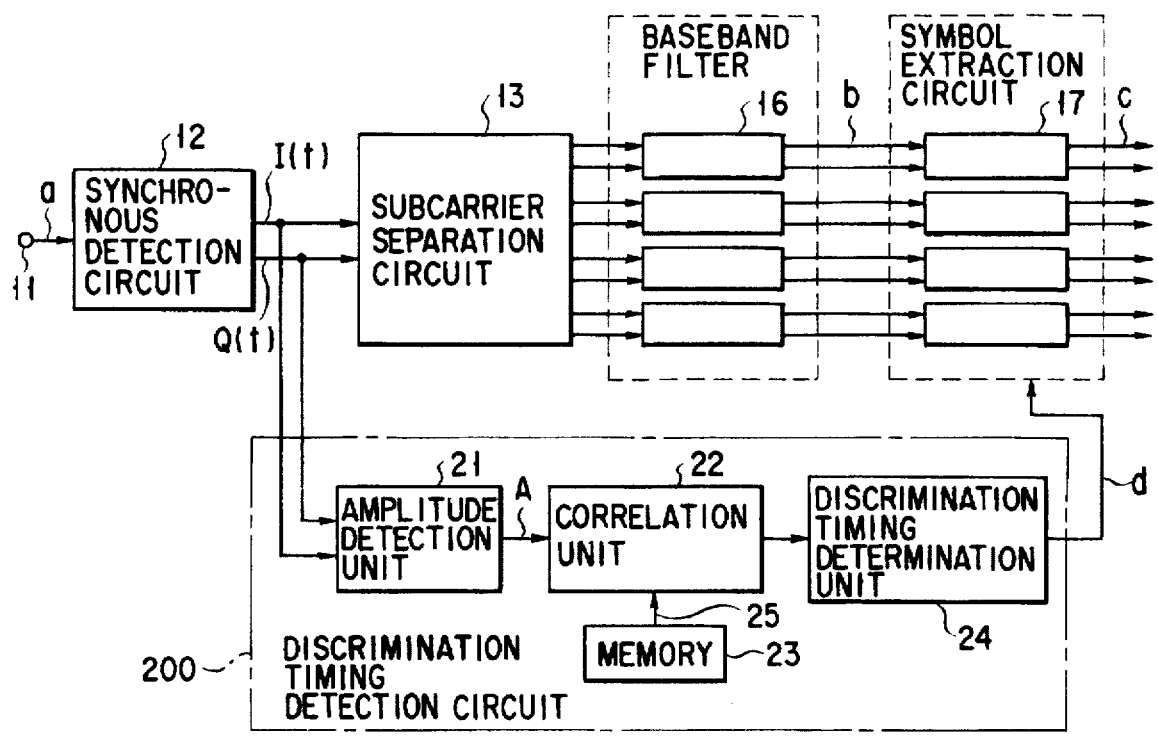
F I G. 1

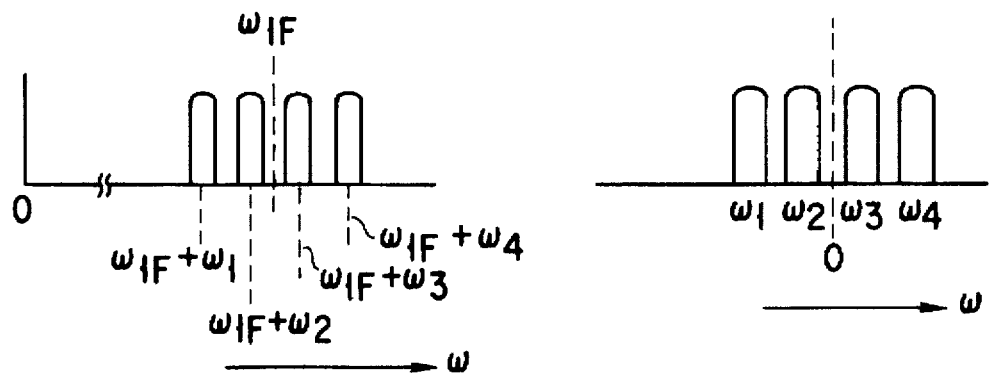
F I G. 6A    F I G. 6B
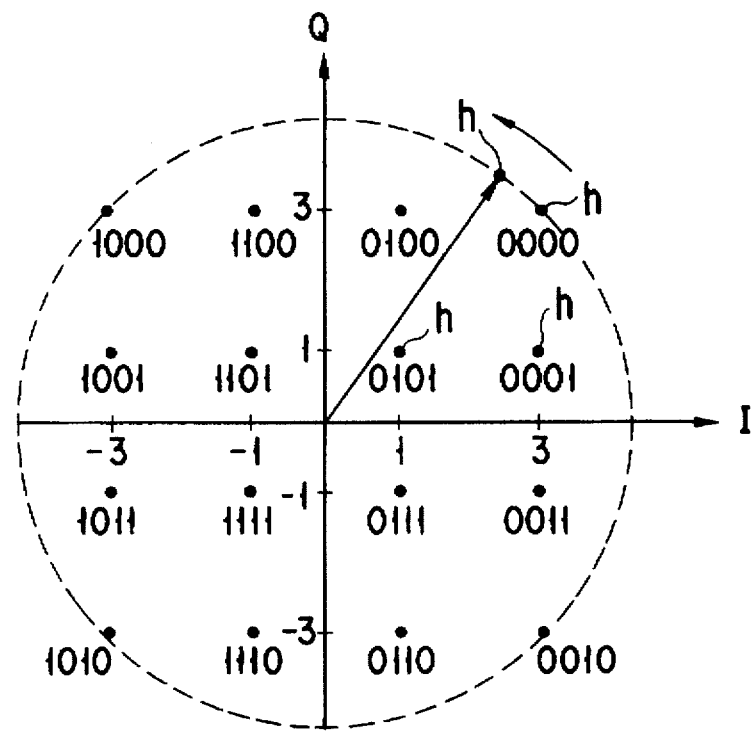
F I G. 7

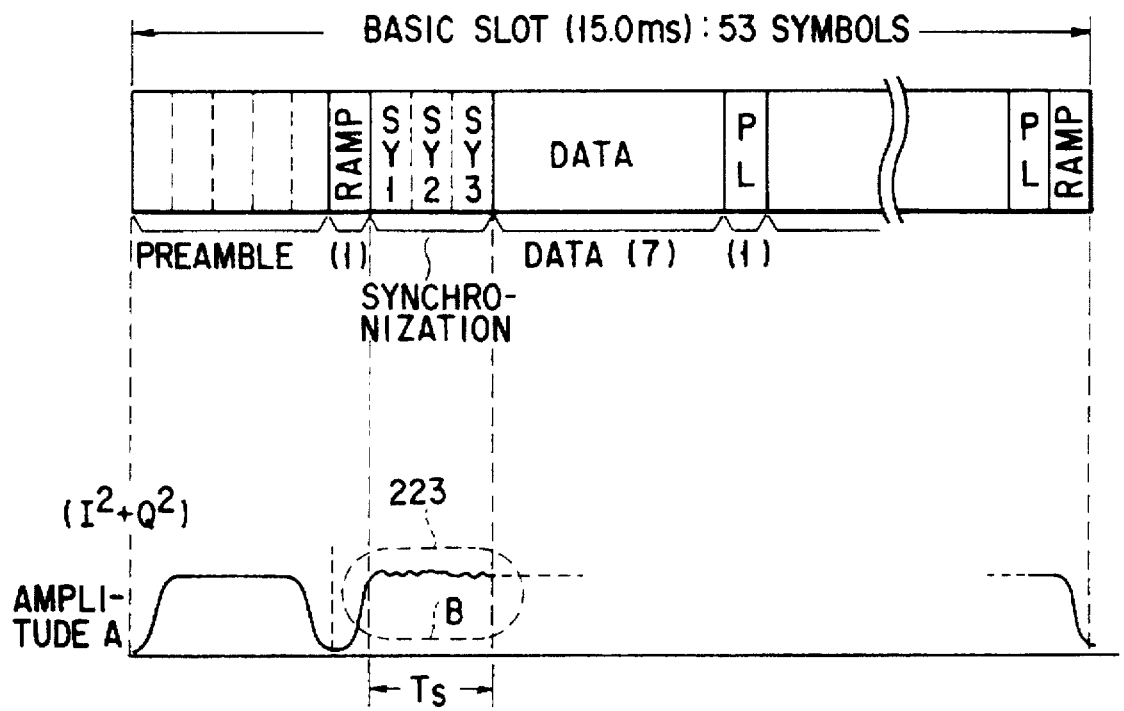
F I G. 16A
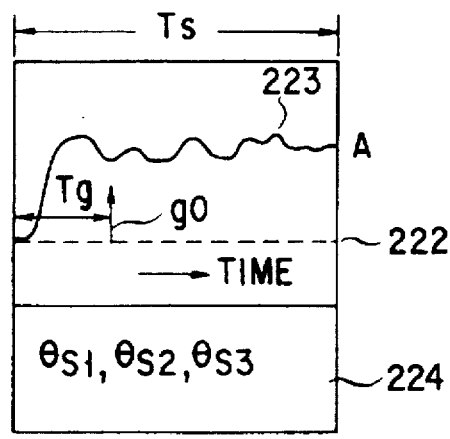
F I G. 16B

TIME DIFFERENCE $\Delta t$ $$\Delta t = \frac{\Delta\theta'_{14} - \Delta\theta'_{13}}{\omega_4 - \omega_3}$$

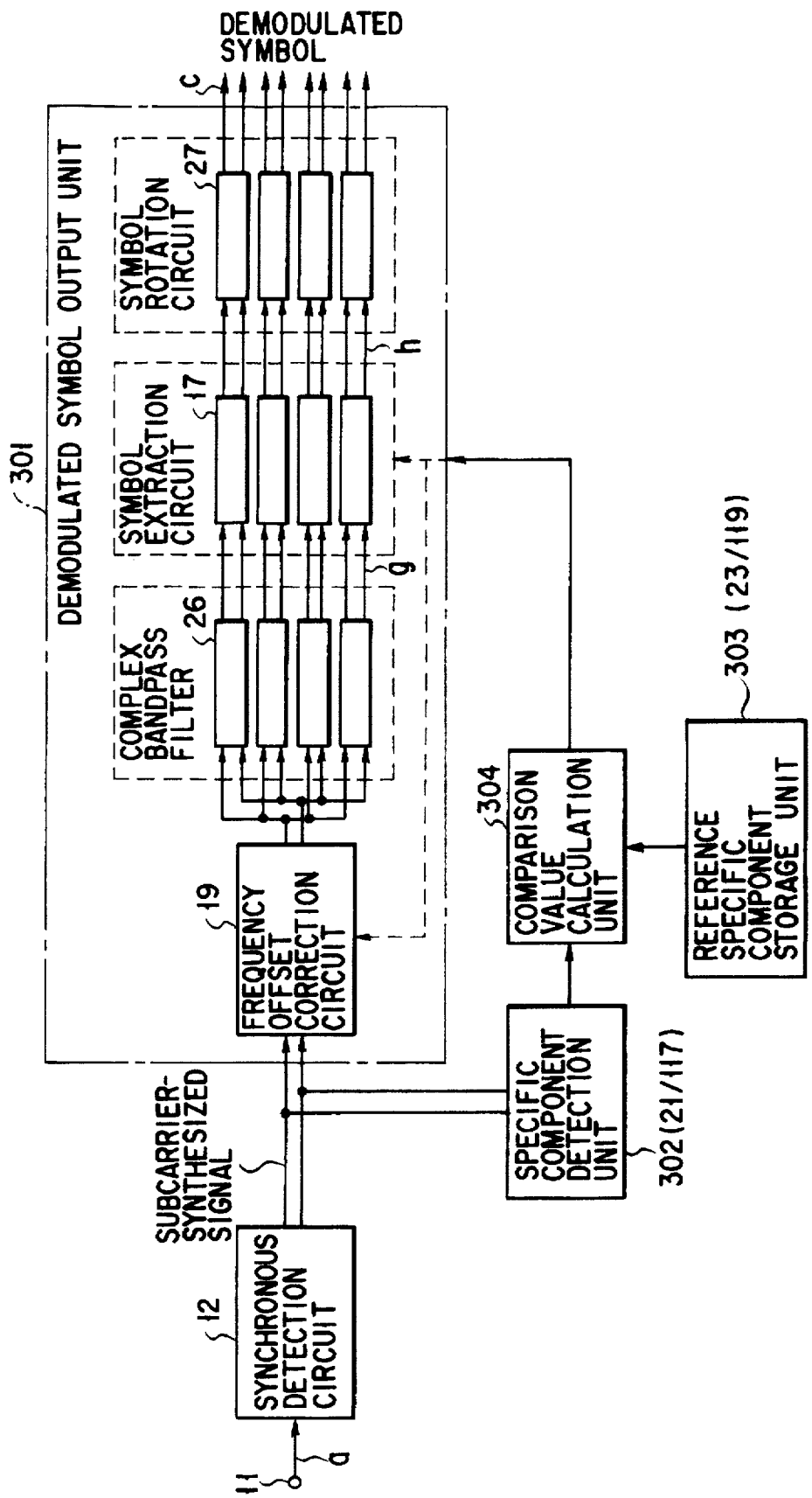
F I G. 19

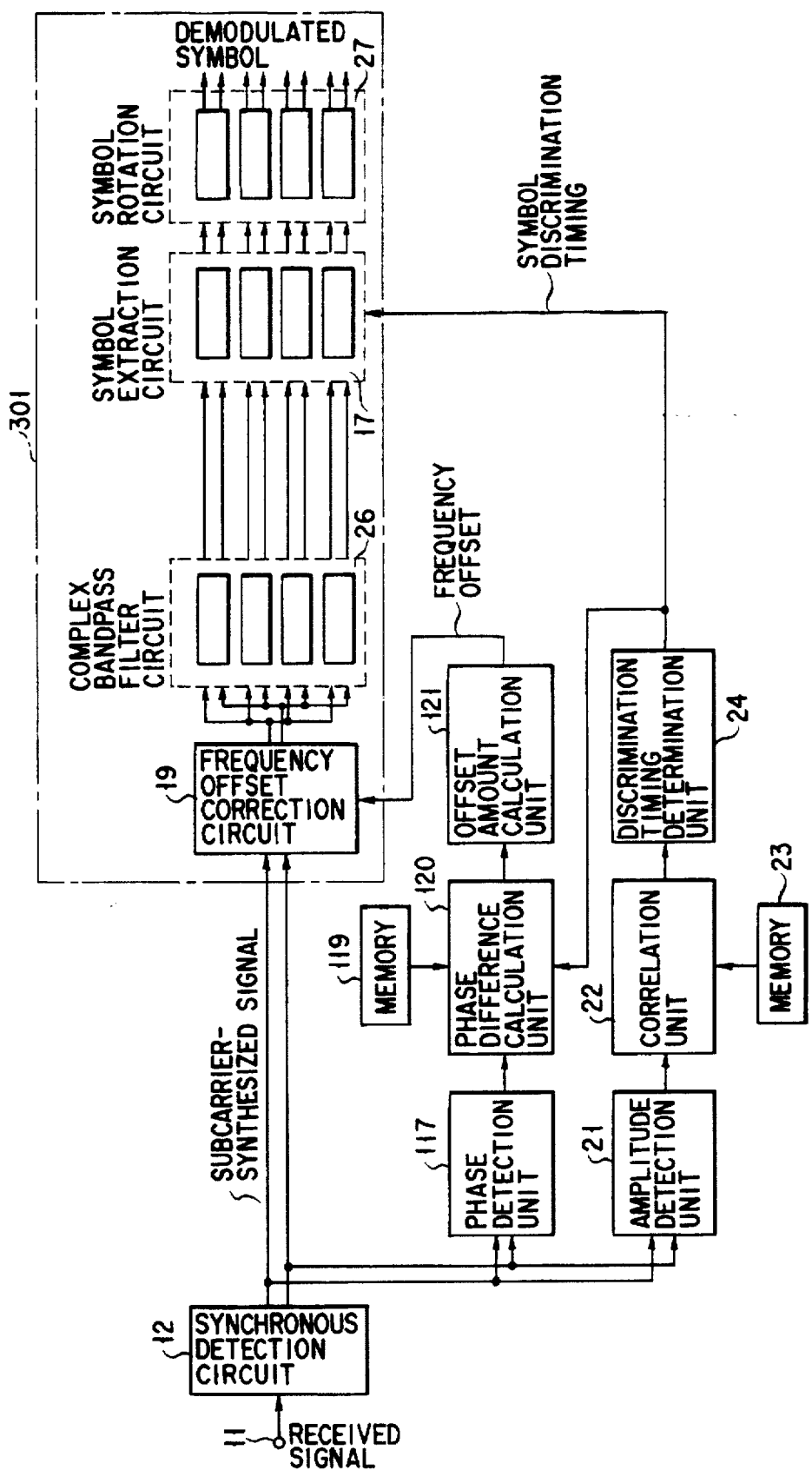
F I G. 20

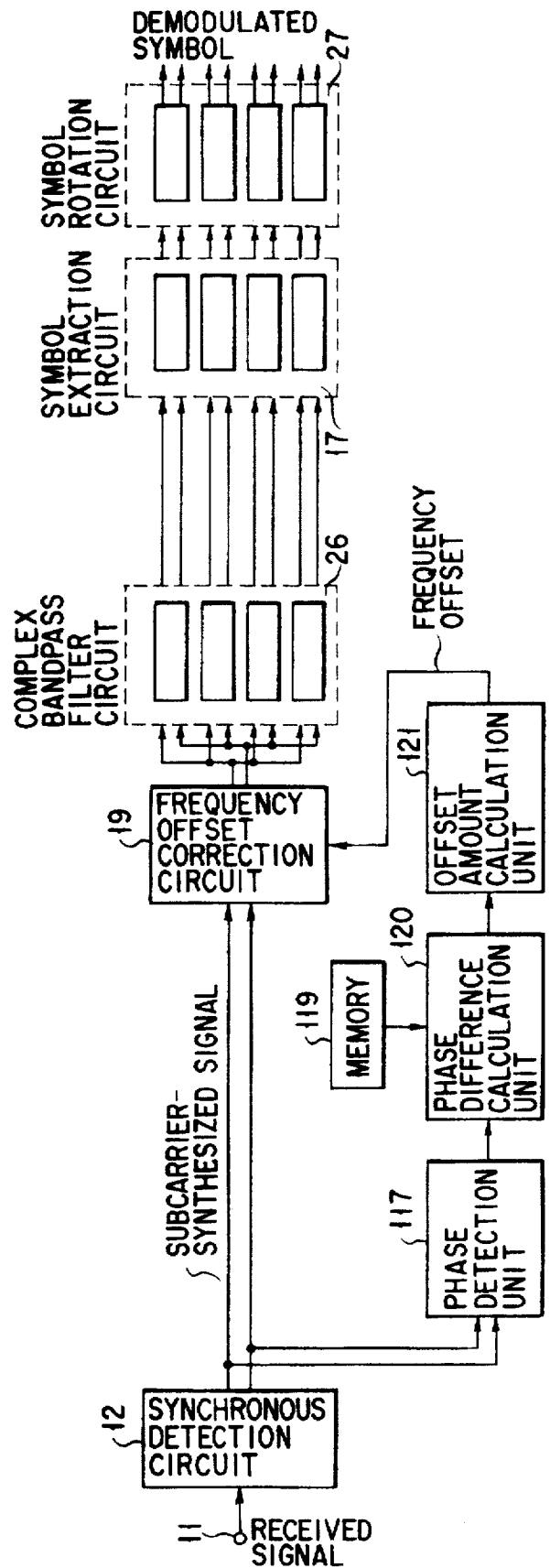
F I G. 22

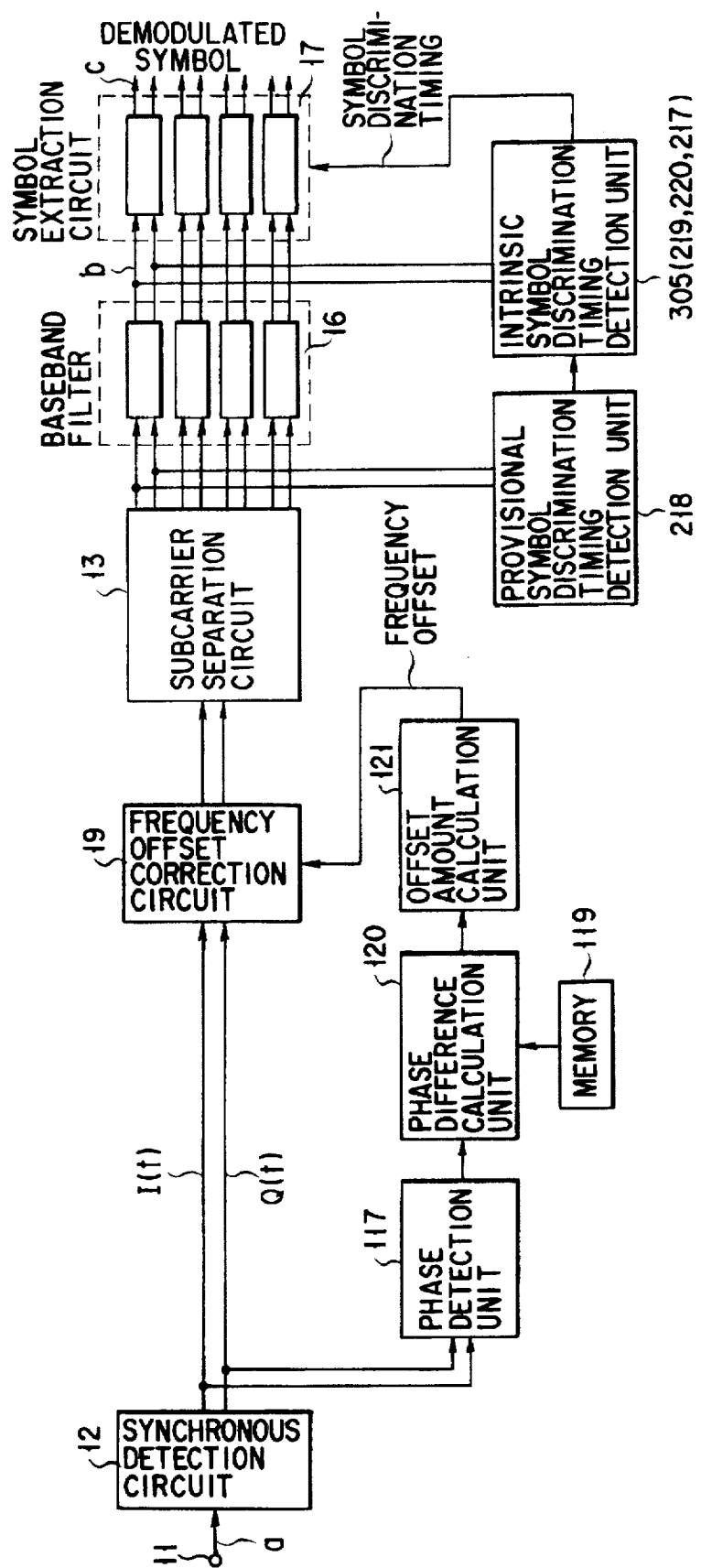
F I G. 23

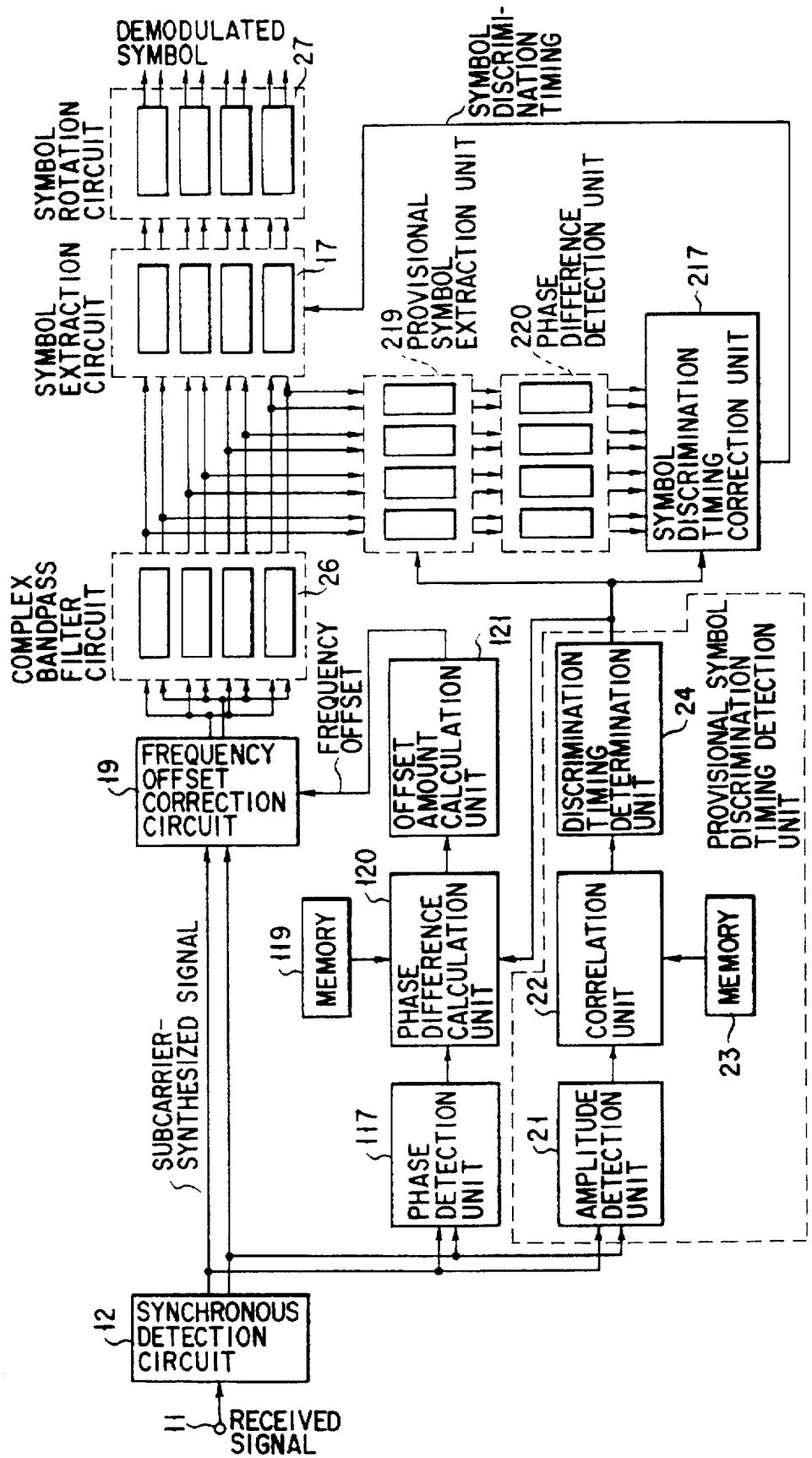
F I G. 24

PRECISION SYMBOL DEMODULATION SYSTEM FOR MULTI-CARRIER MODULATION SIGNAL

BACKGROUND OF THE INVENTION

1. Field of the Invention

The present invention generally relates to a digital communication system such as a mobile communication system and, more particularly, to a symbol demodulation apparatus for demodulating a digital modulation signal modulated by a multi-subcarrier modulation scheme.

2. Description of the Related Art

In recent years, in mobile communication systems which have rapidly spread, a PDC (Japanese personal digital cellular system), an NADC (North American Dual Mode cellular system), a GSM (European digital mobile phone system), a DMCA (Japanese digital MCA system), and the like are known as digital communication systems using TDM (Time-Division Multiplex) and TDMA (Time-Division Multi-Access).

In such a digital communication system, radio waves having different transmission (carrier) frequencies are assigned to a base station serving as a stationary station and a mobile station serving as a movable station. The transmission time is divided into a plurality of time slots, and data communication is performed using a corresponding time slot.

In the digital communication system using the predetermined radio waves as described above, a multi-subcarrier modulation scheme using a plurality of subcarriers may be employed to improve the data transmission characteristics.

More specifically, in the multi-subcarrier modulation scheme, a plurality of normal digital modulation signals are formed and are quadrature-modulated to synthesize the respective subcarrier-modulated signals. The synthesized subcarrier-modulated signals are quadrature-modulated with a main carrier, thereby transmitting them.

An M16QAM scheme employing a 16-value quadrature amplitude modulation scheme to each subcarrier on the transmission station side is available as a kind of multi-subcarrier modulation scheme. FIG. 26 is a block diagram showing an M16QAM scheme modulation apparatus using four subcarriers.

This is a scheme defined in standards RCR STD-32 (Research & Development Center for Radio Systems) for digital MCA (Multi-Channel Access) systems in Japan.

Referring to FIG. 26, serial digital data defined by predetermined clocks and sequentially input from an input terminal 1 are separated by a serial/parallel conversion unit (S/P) 2 in units of four data, and each 4-bit parallel data is input to each orthogonal coding unit 3. Coded signals $S_1$ to $S_4$ output from the respective orthogonal coding units 3 are changed into baseband signals by transmission filters (baseband filters) 4, respectively. The baseband signals are then modulated with subcarrier frequencies $\omega_1$, $\omega_2$, $\omega_3$, and $\omega_4$ by subcarrier modulators 5, respectively.

The modulated signals output from the subcarrier modulators 5 are synthesized by a signal synthesizer 6. The output from the signal synthesizer 6 is time-limited into a burst signal by a window function modulator 7. The burst signal is quadrature-modulated with a carrier frequency $\omega_C$ by a quadrature modulator 8 to obtain a final M16QAM modulated signal. Through a transmitter (not shown), this signal is radiated in air as a burst signal for each slot consisting of a predetermined symbol string containing the above digital data, as shown in FIG. 27.

A digital signal demodulation apparatus for demodulating the digital quadrature-modulated signal has an arrangement, e.g., as shown in FIG. 28.

A received signal a quadrature-modulated by the multi-subcarrier modulation scheme and input through an input terminal 11 is input to a synchronous detection circuit 12. The synchronous detection circuit 12 quadrature-demodulates the received signal with the carrier frequency $\omega_C$ to output a subcarrier-synthesized signal consisting of an in-phase component I(t) and a quadrature component Q(t). For this reason, this subcarrier-synthesized signal does not contain the component of the carrier frequency $\omega_C$, but contains signal components modulated with the four subcarrier frequencies $\omega_1$, $\omega_2$, $\omega_3$, and $\omega_4$ centered on a frequency O.

The subcarrier-synthesized signal is input to a subcarrier separation circuit 13. This subcarrier separation circuit 13 comprises subcarrier synchronous detection circuits 14 whose number is equal to the number of subcarriers of the received signal a and subcarrier separation filters 15 whose number is equal to the number of subcarriers.

Each subcarrier synchronous detection circuit 14 quadrature-demodulates the input subcarrier-synthesized signal with a frequency of the frequencies $\omega_1$, $\omega_2$, $\omega_3$, and $\omega_4$ which corresponds to each subcarrier to output a demodulated signal. The subcarrier synchronous detection circuit 14 outputs a demodulated signal. Signal components except for the one corresponding to the subcarrier are removed from the demodulated signal output from each subcarrier synchronous detection circuit 14.

Each demodulated signal corresponding to each subcarrier and output from the subcarrier separation circuit 13 is input to a baseband filter 16 for the corresponding subcarrier. Each baseband filter 16 performs a root Nyquist filter operation for each demodulated signal to output a demodulated signal b which does not interfere with the other symbols.

Each demodulated signal b is, however, a signal changing over time, so that its signal value must be sampled at an optimal timing for inhibiting interference with other symbols.

Each demodulated signal b output from each baseband filter 16 is input to a corresponding symbol extraction circuit 17. For each symbol extraction circuit 17, a symbol discrimination timing d from a discrimination timing detection circuit 18 is designated. Each symbol extraction circuit 17 samples the signal value of the position designated by the symbol discrimination timing d from each demodulated signal c input thereto and outputs the sampled signal value as a final demodulated symbol c.

The discrimination timing detection circuit 18 detects a specific timing such as a change timing of each symbol contained in a demodulated signal output from a subcarrier separation circuit 13 and defines, as the symbol discrimination timing d, a timing delayed by, e.g., a predetermined time from the specific timing (see the modulated symbol timing in FIG. 27).

The digital signal demodulation apparatus shown in FIG. 28 still has a problem left unsolved.

That is, the signal values of the demodulated signals b output from the subcarrier separation circuits 13 in FIG. 28 may be kept unchanged or may be inverted every symbol in accordance with the data values transmitted through the received signal a, as a matter of course. Therefore, the timing at which the signal value of the demodulated signal changes does not necessarily represent a division timing of each symbol.

To obtain a highly accurate symbol discrimination timing d in the discrimination timing detection circuit 18, timings of changes in signal values of the demodulated signals are extracted for a long time, and the extracted timings are statistically processed to specify the division timing of each symbol. The operation for extracting the timings of the changes in signal values of the demodulated signals for a long time and statistically processing these timings depends on the reception time of the received signal a. Even if this statistical processing is executed using a computer having a high processing speed, it is impossible to determine the highly accurate symbol discrimination timing d within a short time.

Each demodulated signal output from the subcarrier separation circuit 13 or the subsequent circuit must be used to detect a symbol discrimination timing.

When the carrier frequency $\omega_C$ of the received signal a varies, the carrier frequency $\omega_C$ is not equal to the synchronous detection frequency $\omega_C$ of the synchronous detection circuit 12 to cause a frequency offset in the subcarrier-synthesized signal output from the synchronous detection circuit 12. To obtain a correct subcarrier-synthesized signal, a frequency offset amount must be measured, and the frequency offset must be corrected. For this reason, it takes a long period of time to correct these frequency offset amounts.

The digital quadrature-modulation signal cannot be efficiently demodulated in the digital modulation signal demodulation apparatus as a whole.

In addition, in the digital signal demodulation apparatus shown in FIG. 28, the subcarrier synchronous detection circuits 14 constituting the subcarrier separation circuit 13 must execute quadrature demodulation of the subcarrier-synthesized signal obtained by synthesizing the modulated signals having the subcarrier frequencies $\omega_1$, $\omega_2$, $\omega_3$, and $\omega_4$ and had a wide frequency band width.

As a result, this quadrature demodulation must be executed at a speed much higher than the symbol rate. For example, in execution of quadrature demodulation in this subcarrier synchronous detection circuit 14 by, e.g., a computer, high-speed quadrature demodulation must be performed for each subcarrier synchronous detection circuit 14, thereby greatly increasing the processing load of the computer.

In particular, when the number of subcarriers increases, the arithmetic operation amount required for the quadrature demodulation increases, and the processing load of the computer further increases.

An arrangement shown in FIG. 29 is also available as another digital signal demodulation apparatus for demodulating a digital quadrature-modulated signal.

A received signal a quadrature-modulated by a multi-subcarrier modulation scheme and input through an input terminal 11 is input to a synchronous detection circuit 12. The synchronous detection circuit 12 quadrature-demodulates the received signal a with the carrier frequency $\omega_C$ to output a subcarrier-synthesized signal consisting of an in-phase component I(t) and a quadrature component Q(t). For this reason, this subcarrier-synthesized signal does not contain the component of the carrier frequency $\omega_C$, but contains signal components modulated with the four subcarrier frequencies $\omega_1$, $\omega_2$, $\omega_3$, and $\omega_4$ centered on a frequency O.

The frequency offset of the subcarrier-synthesized signal is corrected by a frequency offset correction circuit 19, and the offset-corrected signal is input to a subcarrier separation circuit 13. The subcarrier separation circuit 13 comprises subcarrier synchronous detection circuits whose number is equal to the number of subcarriers of the received signal a and subcarrier separation filters whose number is equal to the number of subcarriers.

In each subcarrier synchronous detection circuit, the input subcarrier-synthesized signal is quadrature-demodulated with a frequency assigned to each subcarrier which is selected from the four frequencies $\omega_2$, $\omega_3$, and $\omega_4$. Signal components corresponding to the subcarriers except for the one assigned to each subcarrier are removed from each quadrature-demodulated signal.

Each demodulated signal corresponding to each subcarrier and output from the subcarrier separation circuit 13 is input to a baseband filter 16 corresponding to each subcarrier and connected to the output of the corresponding subcarrier separation filter. Each baseband filter 16 performs a root Nyquist filter operation to each demodulated signal b and outputs each demodulated symbol c which does not interfere with other symbols.

In the digital modulation signal demodulation apparatus having the above arrangement, the synchronous detection frequency in the synchronous detection circuit 12 is set to the carrier frequency $\omega_C$ of the received signal a. Therefore, they must be ideally equal to each other.

When the carrier frequency of the received signal a is deviated from the reference frequency $\omega_C$ predetermined in, e.g., standards, or the synchronous detection frequency $\omega_C$ of the synchronous detection circuit 12 changes, the synchronous detection frequency $\omega_C$ of the synchronous detection circuit 12 is not equal to the carrier frequency $\omega_C$. For example, when the carrier frequency changes from $\omega_C$ to ($\omega_C+\omega_{OS}$), the frequency $\omega_{OS}$ is left as the offset frequency in the subcarrier-synthesized signal output from the synchronous detection circuit 12.

Following will be described a case of that the carrier frequency of the received signal becomes $\omega_C+\omega_{OS}$ different from $\omega_C$. This is similar to a case of that the synchronous detection frequency of the synchronous detection circuit 12 differs from $\omega_C$ and a case of that both frequencies differ from $\omega_C$.

Note that the offset frequency $\omega_{OS}$ becomes negative when an actual carrier frequency is lower than the reference frequency $\omega_C$. The offset frequency $\omega_{OS}$ includes both positive and negative values.

The offset frequency $\omega_{OS}$ contained in this subcarrier-synthesized signal is contained in each demodulated signal even if the subcarrier-synthesized signal is demodulated with the above frequencies in the subcarrier separation circuit 13. The offset frequency $\omega_{OS}$ are left in each demodulated symbol c output from each baseband filter 16.

When these offset frequency are contained in the demodulated symbol c, the symbol value is rotated over time and cannot be uniquely determined.

To prevent this phenomenon, an offset frequency detection circuit 20 and a frequency offset correction circuit 19 are incorporated in this digital modulation signal demodulation circuit, as shown in FIG. 29.

The offset frequency detection circuit 20 detects a complex symbol as a combination of a demodulated symbol c of an in-phase component I(t) and a demodulated symbol c of a quadrature component Q(t) which are output from one baseband filter 16. When a frequency offset is present, this complex symbol rotates about the origin on the complex coordinate system as compared with the correct symbol. The rotational speed and direction correspond to the offset frequency $\omega_{OS}$. The offset frequency detection circuit 20 detects the offset frequency $\omega_{OS}$ from the rotational speed and direction upon comparison between the complex symbol and the correct symbol and outputs the detected offset frequency to the frequency offset correction circuit 19.

The subcarrier-synthesized signal consisting of the in-phase component I(t) and the quadrature component Q(t) and output from the synchronous detection circuit 12 is a signal, that is, a subcarrier-synthesized signal without a frequency offset and has been rotated about the origin on the complex coordinate system with the frequency $\omega_{OS}$.

The frequency offset correction circuit 19 multiplies the subcarrier-synthesized signal consisting of the in-phase component I(t) and the quadrature component Q(t) by correction signals $\exp\{-j(\omega_{OS})t\}$ to rotate the subcarrier-synthesized signal in a direction to cancel the rotation caused by the offset frequency components $\omega_{OS}$, thereby stopping the rotation by the offset frequency components $\omega_{OS}$ from the subcarrier-synthesized signal.

This offset-corrected subcarrier-synthesized signal is input to the next carrier separation circuit 13. As a result, a correct demodulated symbol c is output from each baseband filter 16.

The following problem is still posed by the digital modulation signal demodulation apparatus (FIG. 29) which corrects the frequency offset of the carrier frequency by the above technique.

To detect the offset frequency components $\omega_{OS}$ to be corrected, the subcarrier-synthesized signal must be separated and demodulated by the subcarrier separation circuit 13 in units of subcarriers, and the root Nyquist filter operation must be performed in the baseband filters 16, thereby obtaining a final demodulated symbol c.

In this case, when the offset frequency $\omega_{OS}$ are small with respect to the symbol rate, the final demodulated symbol c can be obtained. However, when the offset frequency components $\omega_{OS}$ with respect to the symbol rate are large, the subcarrier-synthesized signal itself cannot be perfectly separated by the subcarrier separation circuit 13. In addition, in the baseband filter 16, no correct root Nyquist filter operation can be performed. In this case, correct demodulation cannot be performed in the subcarrier synchronous detection circuits in the subcarrier separation circuit 13, and no final demodulated symbol c can be obtained.

Since the offset frequency $\omega_{OS}$ cannot be detected in the offset frequency detection circuit 20, large offset frequency $\omega_{OS}$ cannot be corrected.

The frequency offset correction circuit 19, the subcarrier separation circuits 13, the baseband filters 16, and the offset frequency detection circuit 20 constitute a kind of closed control loop for correcting a frequency offset. However, in this closed control loop, since constituent elements which are not directly associated with detection and correction of the frequency offset, such as the subcarrier separation circuit 13 and the baseband filter 16, the circuit arrangement cannot quickly cope with a change in offset frequency $\omega_{OS}$.

FIG. 30 shows a conventional digital signal demodulation apparatus incorporating the arrangements shown in FIGS. 28 and 29.

The same reference numerals as in FIGS. 28 and 29 denote the same parts in FIG. 30, and a detailed description thereof will be omitted.

Referring to FIG. 30, a discrimination timing detection unit 18 comprises a nonlinear processing unit 18a, a symbol frequency component extraction unit 18b, and a phase detection unit 18c.

The frequency offset detection circuit 20 comprises a phase difference detection unit 20a and an offset calculation unit 20b.

The digital signal demodulation apparatus shown in FIG. 30 has the same functions as those of the arrangements shown in FIGS. 28 and 29 and also has the same problems as those in FIGS. 28 and 29.

SUMMARY OF THE INVENTION

It is, therefore, an object of the present invention to provide a new and improved symbol demodulation system for a multi-carrier modulation signal in which a precision symbol can be demodulated within a short period of time without being influenced by a frequency offset.

It is another object of the present invention to provide a digital modulation signal demodulation apparatus in which a highly accurate symbol discrimination timing can be set without using a demodulated signal upon separation and demodulation for each subcarrier, the apparatus can cope with a high-speed digital quadrature-modulation signal with a simple arrangement, and a demodulation processing speed can be greatly increased.

It is still another object of the present invention to provide a digital signal demodulation apparatus in which an offset frequency can be easily detected with respect to a carrier frequency without using a demodulated symbol upon separation and demodulation, even a large frequency offset can be properly corrected at a high response speed, and the apparatus can cope with a wide range of frequency offsets with a simple arrangement.

It is still another object of the present invention to provide a digital signal demodulation apparatus in which a symbol discrimination timing is detected from a demodulated signal, and at the same time a symbol discrimination timing previously detected using the phase of the demodulated symbol is corrected to allow detection of a highly accurate symbol discrimination timing within a short period of time, thereby greatly increasing the demodulation accuracy and the demodulation processing speed.

According to an aspect of the present invention, there is provided a symbol demodulation apparatus for a digital modulation signal modulated by a multi-subcarrier modulation scheme using a plurality of subcarriers each having a predetermined frequency, the digital modulation signal including a predetermined number of symbols each having a predetermined timing, the apparatus comprising: demodulation means for demodulating the digital modulation signal to output a subcarrier-synthesized signal; frequency offset detection means for calculating a frequency offset amount of the digital modulation signal with respect to a detection frequency of the demodulation means in accordance with phase information of the subcarrier-synthesized signal from the demodulation means; frequency offset correction means for correcting a frequency offset with respect to the subcarrier-synthesized signal from the demodulation means in accordance with the frequency offset amount from the frequency offset detection means; complex bandpass filter means for performing baseband filter processing to the subcarrier-synthesized signal, for each subcarrier, whose frequency offset is correction by the frequency offset correction means; provisional symbol discrimination timing detection means for provisionally detecting, in accordance with amplitude information of the subcarrier-synthesized signal from the demodulation means, a provisional symbol discrimination timing for extracting each symbol included in the digital modulation signal; provisional symbol extraction means for demodulating an output from the complex bandpass filter means for each subcarrier using the provisional symbol discrimination timing from the provisional symbol discrimination timing detection means to extract a provisional symbol; symbol discrimination timing correction means for correcting the provisional symbol discrimination timing from the provisional symbol discrimination timing detection means in accordance with phase information of the provisional symbol from the provisional symbol extraction means to obtain an intrinsic symbol discrimination timing; symbol extraction means for extracting an intrinsic symbol from the output of the complex bandpass filter means for each subcarrier using the intrinsic symbol discrimination timing from the symbol discrimination timing correction means; and symbol rotation means for rotating the intrinsic symbol from the symbol extraction means in a direction reverse to a direction of rotation at a corresponding subcarrier frequency so as to substantially stop rotation of the intrinsic symbol, thereby outputting a demodulated symbol.

According to another aspect of the present invention, there is provided a digital modulation signal demodulation apparatus comprising: specific component detection means for sequentially detecting specific components of a subcarrier-synthesized signal obtained by modulating reference symbols having a predetermined data form using a multi-subcarrier modulation scheme; reference specific component storage means for prestoring reference specific components corresponding to specific components of the reference symbols; comparison value calculation means for comparing the specific components sequentially detected by the specific component detection means with the reference specific components stored in the reference specific component storage means; and demodulated symbol output means for outputting signal values for each subcarrier as demodulated symbols using comparison values sequentially calculated by said comparison value calculation means.

Additional objects and advantages of the invention will be set forth in the description which follows, and in part will be obvious from the description, or may be learned by practice of the invention. The objects and advantages of the invention may be realize and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing the schematic arrangement of a digital signal demodulation apparatus according to the first embodiment of the present invention;

FIGS. 6A and 6B are views showing the frequency characteristics of a plurality of bandpass filters in the apparatuses shown in FIGS. 4 and 5;

FIG. 7 is a schematic view showing a rotation operation of a complex received symbol in the apparatuses shown in FIGS. 4 and 5;

FIGS. 16A and 16B are views for explaining a technique for determining a symbol discrimination timing in the apparatus of the sixth embodiment;

FIG. 19 is a block diagram showing the arrangement of a digital signal demodulation apparatus according to the seventh embodiment of the present invention;

FIG. 20 is a block diagram showing the arrangement of a digital signal demodulation apparatus according to the eighth embodiment of the present invention;

FIG. 22 is a block diagram showing the arrangement of a digital signal demodulation apparatus according to the 10th embodiment of the present invention;

FIG. 23 is a block diagram showing the arrangement of a digital signal demodulation apparatus according to the 11th embodiment of the present invention;

FIG. 24 is a block diagram showing the arrangement of a digital signal demodulation apparatus according to the 12th embodiment of the present invention;

DETAILED DESCRIPTION OF THE PREFERRED EMBODIMENTS

Figure 2A:
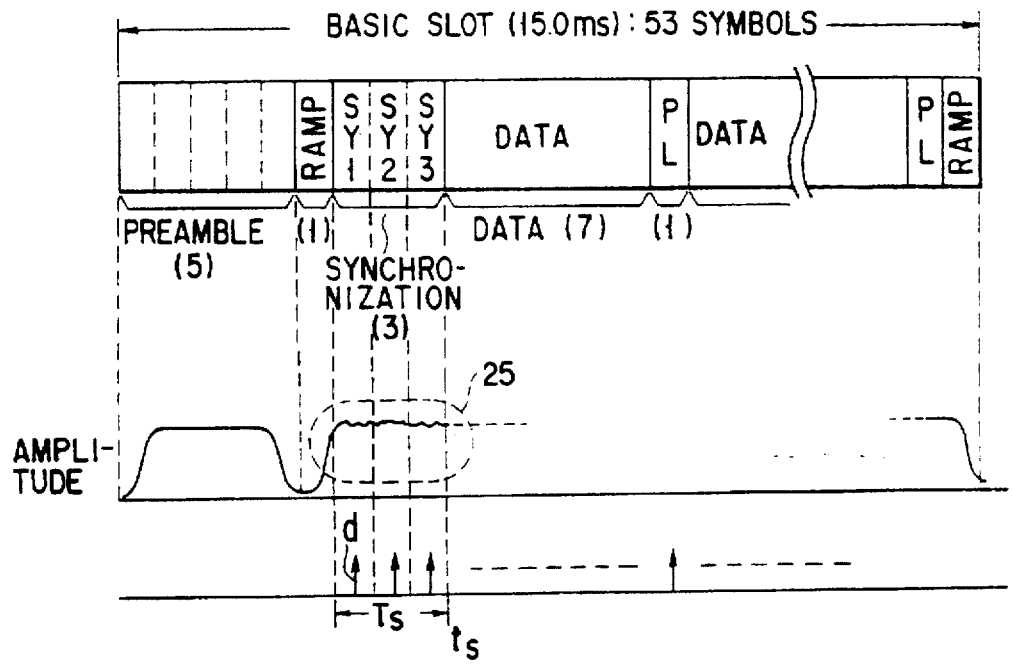
FIGS. 2A and 2B are views for explaining a technique for determining a symbol discrimination timing in the apparatus of the first embodiment.

Reference will now be made in detail to the presently preferred embodiments of the invention as illustrated in the accompanying drawings, in which like reference characters designate like or corresponding parts throughout the several drawings.

First of all, embodiments included in the first mode of the present invention will be generally described.

According to the first embodiment of the present invention, a digital modulation signal demodulation apparatus for outputting, as demodulated symbols, signal values at a symbol discrimination timing for each subcarrier from a subcarrier-synthesized signal serving as a received signal modulated by a multi-subcarrier modulation scheme comprises: an amplitude detection means for sequentially detecting amplitudes of the subcarrier-synthesized signal; a reference amplitude storage means for prestoring a reference amplitude identical to an amplitude of a predetermined reference symbol portion included in the received signal; a correlation calculation means for sequentially calculating correlation values between the amplitude sequentially detected by the amplitude detection means and the reference amplitude; and a discrimination timing determination means for determining a symbol discrimination timing on the basis of time representing a maximum value of the correlation values sequentially calculated by the correlation calculation means.

The digital modulation signal demodulation apparatus according to the second embodiment of the present invention comprises: a plurality of complex bandpass filters, each having a passing center frequency set at a corresponding subcarrier frequency, each for receiving a received signal modulated by a multi-subcarrier modulation scheme and performing complex bandpass filter processing to the received signal to obtain a complex received symbol which rotates on a complex coordinate system; and a plurality of symbol rotation means each for multiplying the complex received symbol obtained by each complex bandpass filter by a reversely rotating correction complex number and stopping rotation of the complex received symbol to output demodulated symbol including an in-phase component and a quadrature component.

The digital modulation signal demodulation apparatus according to the third embodiment of the present invention comprises: a synchronous detection circuit for demodulating a received signal modulated by a multi-subcarrier modulation scheme into a subcarrier-synthesized signal; a plurality of complex bandpass filters each for performing complex bandpass filter processing to the subcarrier-synthesized signal output from the synchronous detection circuit to obtain a complex received symbol which rotates in a certain direction at a certain speed in correspondence with the frequency of each subcarrier; and a plurality of symbol rotation means each for multiplying the complex received symbol obtained by each complex bandpass filter by a reversely rotating correction complex number and stopping rotation of the complex received symbol to output demodulated symbol including an in-phase component and a quadrature component.

In the digital modulation signal demodulation apparatus having the above arrangement according to the first embodiment of the present invention, the subcarrier-synthesized signal obtained from, e.g., the received signal consists of an in-phase component I(t) and a quadrature component Q(t). Note that each of these in-phase component I(t) and quadrature component Q(t) includes each subcarrier component changing over time. The amplitude of the subcarrier-synthesized signal represented by the in-phase I(t) component and the quadrature component Q(t) is given by $(I^2+Q^2)^{1/2}$.

When the data form of the received signal is a form in which data to be transmitted is incorporated in a transmission slot and sent, this transmission slot incorporates various fixed data in addition to the data to be transmitted.

A received signal portion corresponding to the fixed data is set as a reference symbol. The amplitude wave, corresponding to the reference symbol, of the subcarrier-synthesized signal obtained by demodulating the received signal is stored and held as a reference amplitude wave. The amplitude wave of subcarrier-synthesized signal is detected by sequentially input signal. At time representing a maximum value of correlation values between the detected amplitudes and the stored and held reference amplitude, detected amplitude wave is synchronized to the reference amplitude wave. A symbol discrimination timing can be determined on the basis of this detected time.

In this manner, the symbol discrimination timing can be easily determined within a short period of time.

In the digital modulation signal demodulation apparatus according to the second embodiment of the present invention, the complex bandpass filter processing is performed to the received signal by each complex bandpass filter having a passing center frequency set at a corresponding subcarrier frequency in accordance with root Nyquist characteristics centered on the subcarrier frequency.

As a result, a signal output from each complex bandpass filter includes only a corresponding subcarrier frequency. In addition, the signal serves as a complex received symbol which does not interfere with another symbol because the Nyquist conditions are established. This complex received symbol, however, is not subjected to quadrature demodulation with a subcarrier, so that the symbol value rotates on the complex coordinate system in a certain direction at a certain speed in correspondence with the subcarrier frequency. Without any processing, the symbol value is not uniquely determined. For this reason, the symbol value is multiplied by a reversely rotating correction complex number to stop the rotation of the symbol value.

Demodulated symbol consisting in-phase component and quadrature component can be obtained from this complex received symbol which is stopped rotating.

That is, a subcarrier separation circuit which must perform complicated demodulation conversion processing need not be incorporated.

In the third embodiment of the present invention, the received signal is demodulated into a subcarrier-synthesized signal of intermediate frequency by a synchronous detection circuit. Then, the complex bandpass filter processing is performed to this subcarrier-synthesized signal. In this case, the complex bandpass filter processing can be executed at a low speed because the subcarrier-synthesized signal input to each bandpass filter is centered on an intermediate frequency $\omega_{IF}$.

The embodiments included in the first mode of the present invention will be described below in detail with reference to the accompanying drawings.

FIG. 1 is a block diagram showing the arrangement of a digital modulation signal demodulation apparatus of the first embodiment. The reference numerals as in the conventional digital signal demodulation apparatus in FIG. 28 denote the same parts in FIG. 1.

A received signal a quadrature-modulated by a multi-subcarrier modulation scheme and input through an input terminal 11 is input to a synchronous detection circuit 12. This synchronous detection circuit 12 quadrature-demodulates the received signal a with a carrier frequency $\omega_C$ of the received signal a and outputs a subcarrier-synthesized signal consisting of an in-phase component I(t) and a quadrature component Q(t).

Figure 28:
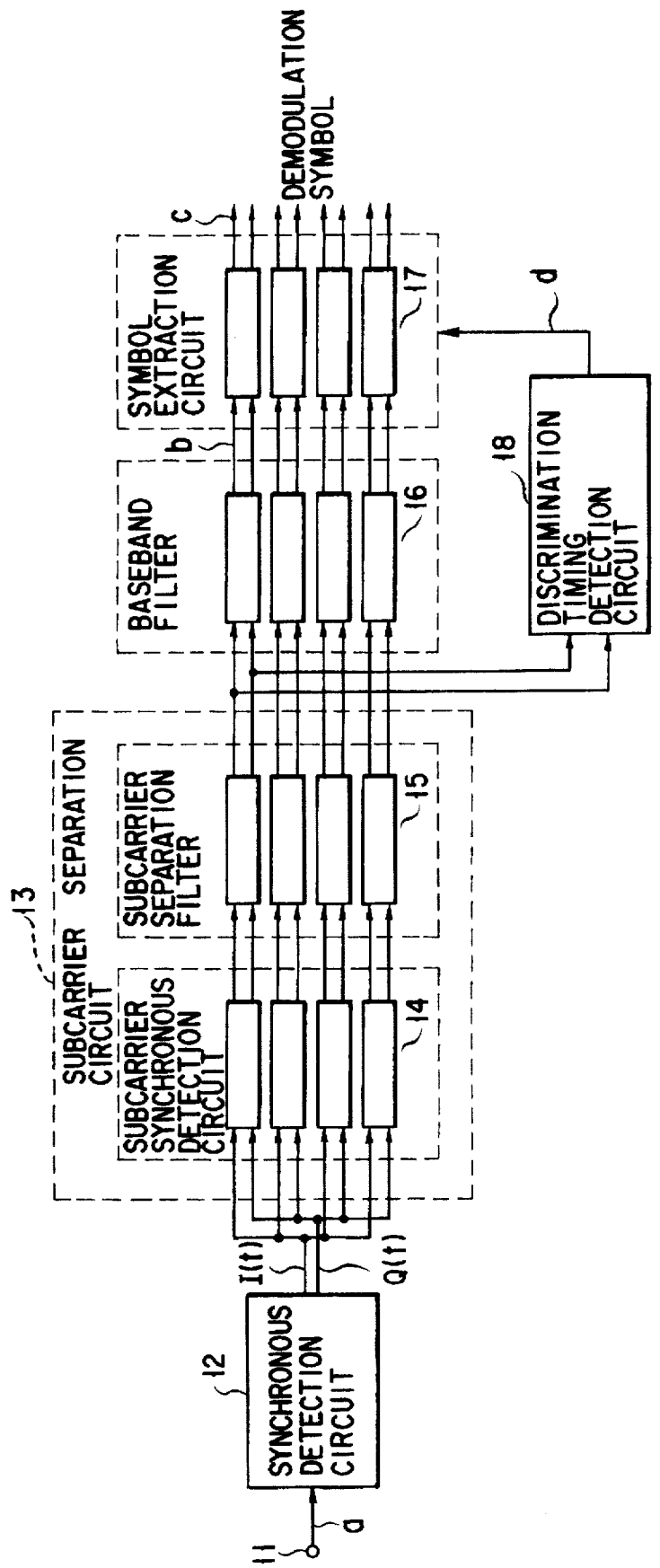
FIG. 28 is a block diagram showing the arrangement of a general conventional digital signal demodulation apparatus.
Figure 30:
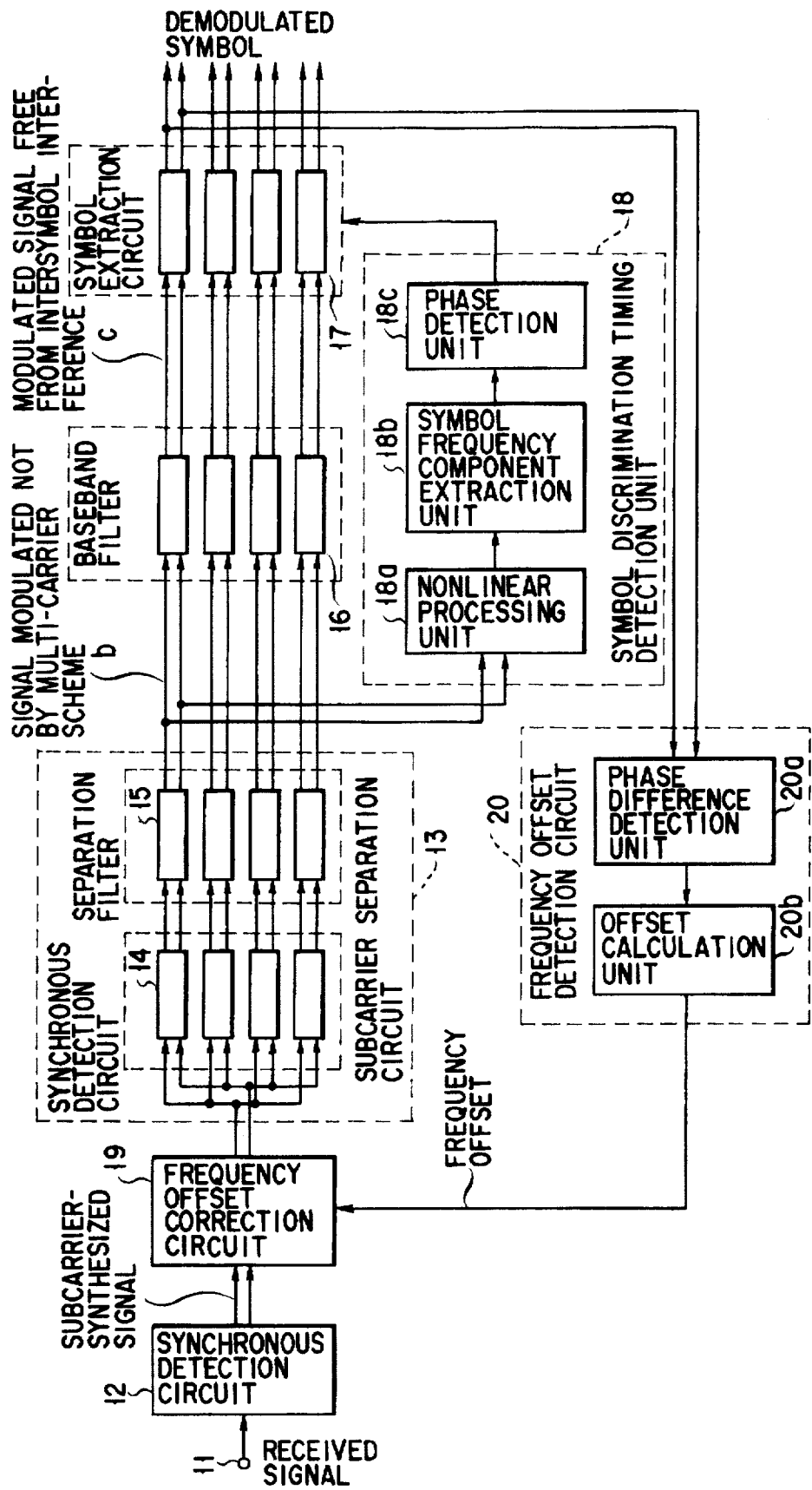
FIG. 30 is a block diagram showing the arrangement of a conventional digital signal demodulation apparatus incorporating the function of the apparatus shown in FIG. 29.

The subcarrier-synthesized signal is then input to a subcarrier separation circuit 13. This separation circuit 13 comprises subcarrier synchronous detection circuits whose number is equal to the number of subcarriers of the received signal a and subcarrier separation filters whose number is equal to the number of subcarriers, as shown in FIG. 28.

The input subcarrier-synthesized signal is quadrature-demodulated with a frequency of four frequencies $\omega_1$, $\omega_2$, $\omega_3$, and $\omega_4$ which corresponds to each subcarrier. Subcarrier signals except for the one corresponding to the subcarrier are removed by a corresponding subcarrier separation filter.

Each demodulated signal corresponding to each subcarrier and output from the subcarrier separation circuit 13 is input to a corresponding baseband filter 16.

Figures 3A, 3B:
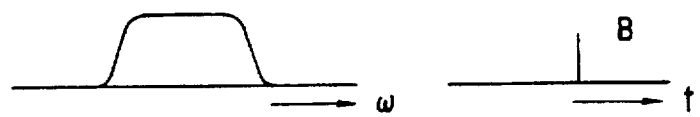
FIGS. 3A, 3B, and 3C are views for explaining an operation of a baseband filter in the apparatus of the first embodiment.
Figure 3C:
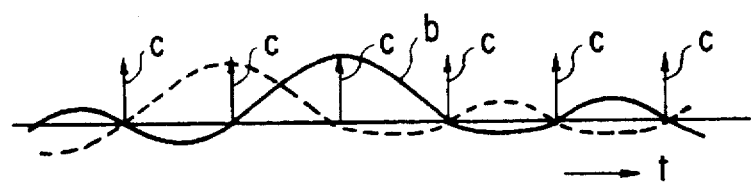
Figure 26:
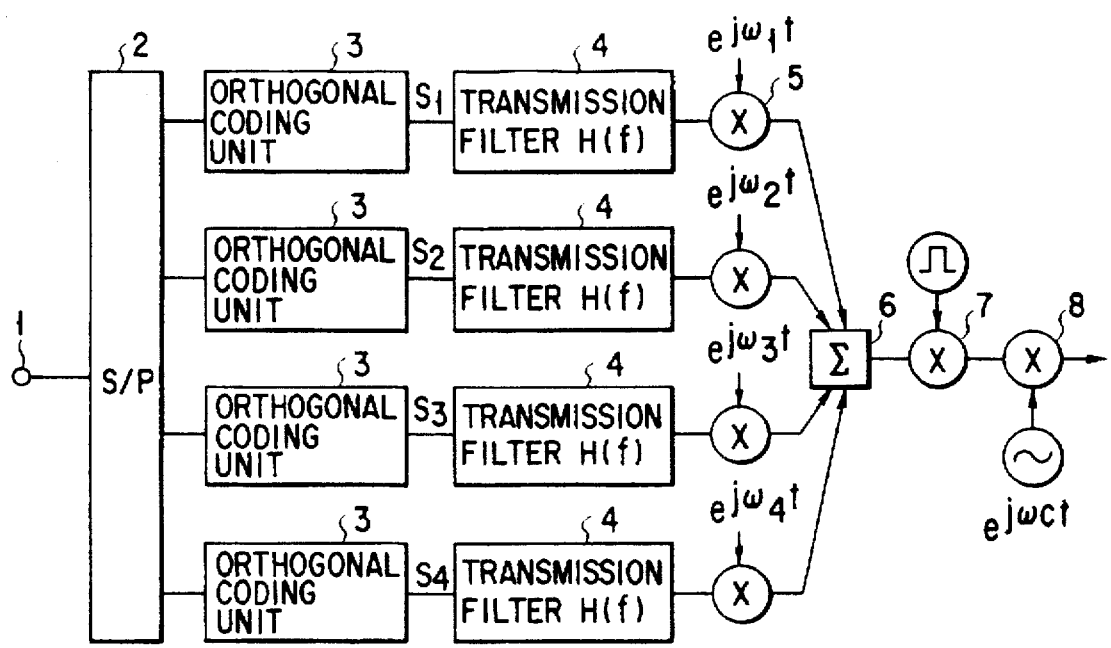
FIG. 26 is a block diagram showing the schematic arrangement of a conventional modulation apparatus employing a multi-subcarrier modulation scheme.

The cascade characteristics of each baseband filter 4 in the modulation apparatus as shown in FIG. 26 and each baseband filter 16 in the demodulation apparatus has the time response characteristic shown in FIG. 3C when an impulse signal B shown in FIG. 3B is input to, e.g., a filter having a frequency characteristic shown in, e.g., FIG. 3A.

When the baseband filter 4 in the modulation apparatus as shown in FIG. 26 has root Nyquist characteristics, the corresponding baseband filter 16 in the demodulation apparatus executes the root Nyquist filter operation for a corresponding demodulated signal to output a demodulated signal b which does not interfere with other symbols c, as shown in FIG. 3C.

Each demodulated signal b output from each baseband filter 16 is input to a next symbol extraction circuit 17 corresponding to each subcarrier. A symbol discrimination timing d from a discrimination timing detection circuit 200 is designated for each symbol extraction circuit 17. A signal value, of the input demodulated signal b, at a position designated by the symbol discrimination timing d is extracted by the symbol extraction circuit 17. This extracted signal value is output as a final demodulated symbol c.

The discrimination timing detection circuit 200 has an amplitude detection unit 21, a correlation unit 22, a memory 23, and a discrimination timing determination unit 24.

The amplitude detection unit 21 detects the amplitude of the subcarrier-synthesized signal consisting of the in-phase component I(t) and the quadrature component Q(t) output from the synchronous detection circuit 12. More specifically, the amplitude detection unit 21 calculates the square value $(I^2+Q^2)$ of the amplitude using the in-phase component I and the quadrature component Q.

Figure 27:
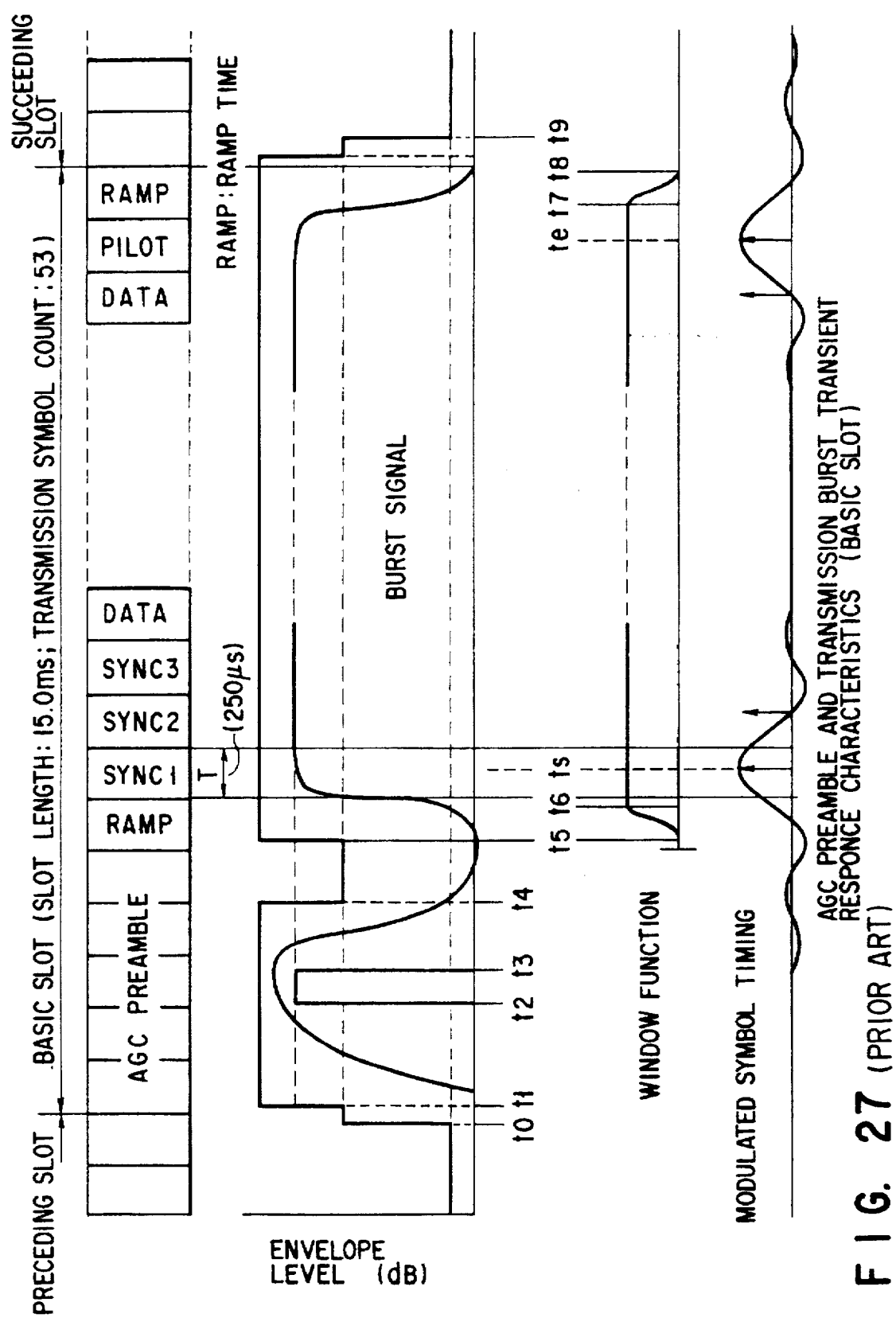
FIG. 27 is a view showing the correspondence between the modulated symbol timing of the modulated signal obtained in the modulation apparatus in FIG. 26 and the basic slot.

On the other hand, the data form of the received signal a quadrature-modulated by the multi-subcarrier scheme has a transmission slot (upper stage of FIG. 2A) obtained by simplifying the format (FIG. 27) as the standards (RCR STD-32, Research & Development Center for Radio Systems) of the digital MCA system in the communication system incorporating the apparatus of this embodiment.

In these standards, one transmission slot (basic uplink slot) has 60 symbols. A preamble is set in the first five symbols of length, and a one-symbol ramp portion follows the preamble. Synchronization symbols SY1 to SY3 are set for the following three symbols, respectively. Data symbols to be transmitted are sequentially set following these synchronization symbols SY1 to SY3. Several pilot symbols PL are inserted between data symbols. A one-symbol ramp portion is set at the end of the transmission slot.

Of these symbols, 53 symbols except to the preamble and the ramp portion are effective transmitting symbols.

Figure 2B:
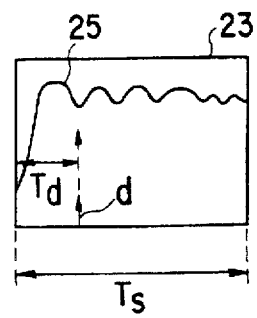

The received signal a having this transmission slot is demodulated by the synchronous detection circuit 12, and an amplitude A (square value as $I^2+Q^2$) of the resultant subcarrier-synthesized signal from the synchronous detection circuit 12 changes as shown in FIG. 2B. This amplitude value, of course, changes depending on the data wave form of each symbol.

In this transmission slot, all the values except for the data to be transmitted are eigenvalues. Therefore, the amplitude wave form which corresponds to the eigenvalue is about eigenvalue.

In this embodiment, of all the eigenvalues of the received signal a, the three synchronization symbols SY1 to SY3 of the seventh symbol to the ninth symbol are used as reference symbols, and an envelope waveform of a time $T_S$ of the amplitude value of the subcarrier-synthesized signal which corresponds to the reference symbols is prestored as a reference amplitude waveform 25 in a memory 23.

The waveform positions of the reference amplitude waveform 25 and the symbol timings of the synchronization symbols SY1 to SY3 in the transmission slot have a one-to-one correspondence. Such a timing is stored as a symbol discrimination timing d in the memory 23.

The amplitude values A sequentially output from the amplitude detection unit 21 are input to the correlation unit 22 connected to the output of the amplitude detection unit 21. The correlation unit 22 also receives the reference amplitude waveform 25 of the time $T_S$ from the memory 23. The correlation unit 22 sequentially extracts the measurement amplitude waveform of the latest amplitude value of the time $T_S$ from the amplitude values A sequentially input from the amplitude detection unit 21 and sequentially calculates correlation values between the reference amplitude waveform 25 and the sequentially extracted measurement amplitude waveforms.

The discrimination timing determination unit 24 detects sampling time $t_S$ representing a maximum value of correlation values sequentially input from the correlation unit 22. The symbol discrimination timing is a timing before a predetermined time $(T_s-T_d)$ as shown in FIG. 2B. The discrimination timing determination unit 24 outputs the symbol discrimination timing d to each symbol extraction circuit 17.

Each symbol extraction circuit 17 samples the signal value of each input demodulated signal b at the position designated by the symbol discrimination timing d, thereby outputting the final demodulated symbol c.

In the digital modulation signal demodulation apparatus having the above arrangement, a time required for sequentially calculating the amplitudes A from the subcarrier constituent signals sequentially input to the amplitude detection unit 21 can be substantially neglected. The processing time for calculating correlation values between the detected amplitude waveforms of the predetermined time $T_S$ and the reference amplitude waveform 25 is longest. This processing time, however, can be easily shortened by using, e.g., a computer having a high processing speed. In addition, if a maximum value of correlation values is determined, the symbol discrimination timing d is immediately determined.

The calculation time of the symbol discrimination timing d is much shorter than that in the conventional apparatus which calculates the symbol discrimination timing d from each demodulated signal output from the subcarrier separation circuit 13 shown in FIG. 28. As a result, the signal demodulation processing efficiency of the digital modulation signal demodulation apparatus can be greatly increased.

Since demodulated signals output from the subcarrier separation circuit 13 are not used, the frequency offset of a carrier frequency $\omega_C$ of the received signal a which adversely affects quadrature demodulation of a subcarrier signal does not influence the processing of the symbol discrimination timing d in the first embodiment. A highly accurate symbol discrimination timing d can be obtained with a simple arrangement, thereby improving the digital modulation signal demodulation accuracy.

Figure 4:
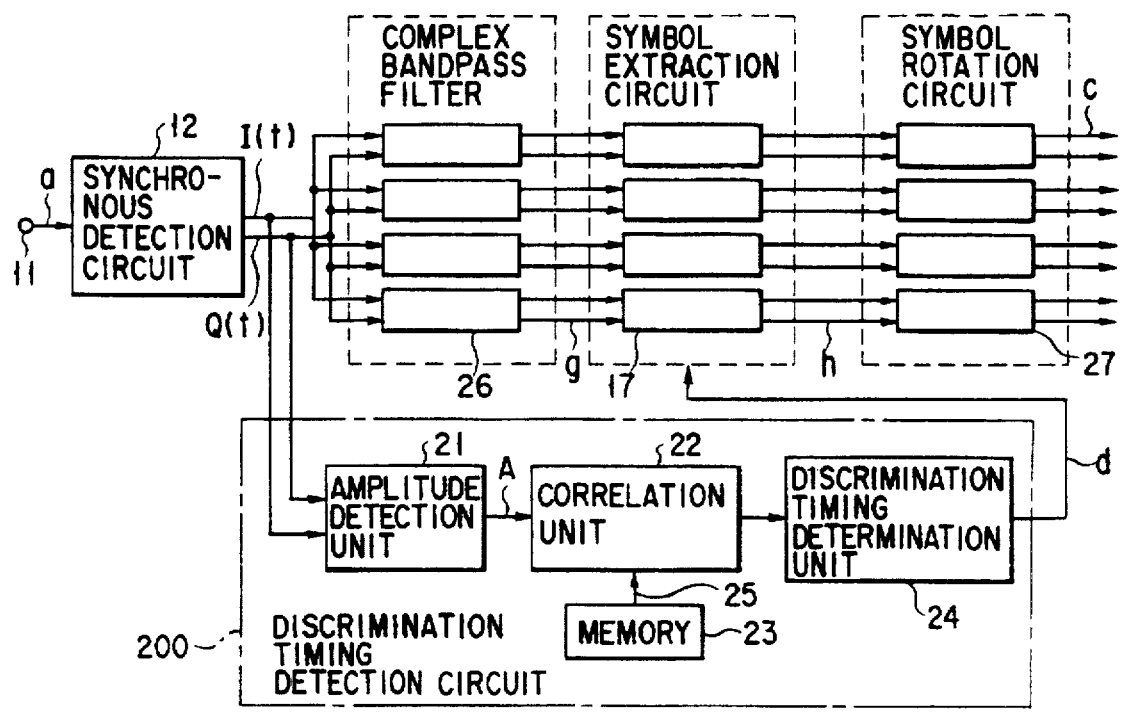
FIG. 4 is a block diagram showing the schematic arrangement of a digital signal demodulation apparatus according to the second embodiment of the present invention.

FIG. 4 is a block diagram showing the arrangement of a digital modulation signal demodulation apparatus of the second embodiment. The reference numerals as in the first embodiment in FIG. 1 denote the same parts in FIG. 4, and a repetitive description will be omitted.

A received signal a input through an input terminal 11 is quadrature-demodulated by a synchronous detection circuit 12 with a carrier frequency $\omega_C$ and output as a subcarrier-synthesized signal consisting of an in-phase component I(t) and a quadrature component Q(t). This subcarrier-synthesized signal contains signal components modulated by subcarrier $\omega_1$, $\omega_2$, $\omega_3$, and $\omega_4$ centered on a frequency O.

The subcarrier-synthesized signal is input to a discrimination timing detection circuit 200 and a complex bandpass filter 26 corresponding to each subcarrier.

The passing center frequencies of the complex bandpass filters 26 are set at the subcarrier frequencies $\omega_1$, $\omega_2$, $\omega_3$, and $\omega_4$, respectively. Each complex bandpass filter 26 extracts only a frequency component corresponding to each subcarrier from the subcarrier-synthesized signal.

When the baseband filter on the transmission side of the received signal a has root Nyquist characteristics, the corresponding bandpass filter 26 is a complex bandpass filter having root Nyquist characteristics corresponding to the symbol rate.

Each complex bandpass filter 26 receives the subcarrier-synthesized signal having a corresponding complex number. The complex bandpass filter 26 executes the root Nyquist filter operation to this subcarrier-synthesized signal to output a complex received signal g consisting of the in-phase component I(t) and the quadrature component Q(t) for each subcarrier.

The complex received signal g output from each complex bandpass filter 26 is input to a corresponding symbol detection circuit 17. Each symbol detection circuit 17 samples a signal value of the input complex received signal g at a position designated by a symbol discrimination timing d, thereby outputting a complex received symbol g.

The complex received symbol h is not quadrature-demodulated with a corresponding subcarrier. The complex received symbol h rotates on the complex coordinate system in a certain direction at a certain speed in correspondence with a corresponding one of the frequencies $\omega_1$, $\omega_2$, $\omega_3$, and $\omega_4$. Therefore, the symbol value cannot be specified during rotation.

For this reason, each rotating complex received symbol h is sent to a symbol rotation circuit 27 corresponding to each subcarrier. The symbol rotation circuit 27 multiples this complex received symbol h by a reversely rotating correction complex number to stop the rotation of a complex received signal h.

More specifically, for example, when the complex received symbol h input to the symbol rotation circuit 27 for the subcarrier having the frequency $\omega_1$ is represented by $I_1+jQ_1$, this complex received symbol h rotates in a certain direction at a certain speed, which direction and speed are represented by $\omega_1$. The rotation of the complex received symbol h is stopped by multiplying the complex received symbol h by a reversely rotating correction complex number $\exp(-j\omega_1 t)$.

A final demodulated symbol c consisting of in-phase and quadrature components is stopped ratiting from each complex received symbol h and output.

The digital modulation signal demodulation apparatus having the above arrangement does not require a subcarrier separation circuit in which complicated demodulation conversion processing must be executed at a high sampling rate. That is, the symbol rotation circuit 27 performs rotation processing at a normal symbol rate. This symbol rate is, of course, much lower than the sampling rate of the subcarrier-synthesized signal, so a high-speed computer need not be used.

When the carrier frequency $\omega_C$ of the received signal a has a small frequency offset, the frequency offset of the demodulated signal c can be corrected even the conventional apparatus shown in FIG. 28, by using a frequency offset correcting circuit (not shown).

To the contrary, in the apparatus of the second embodiment, the rotation processing of the symbol rotation circuit 27 for the complex received signal h is also processing of changing a frequency offset amount.

For this reason, another circuit for correcting the frequency offset of the carrier frequency $\omega_C$ of the received signal c need not be provided, thereby further simplifying the arrangement of the digital modulation signal demodulation apparatus.

Figure 5:
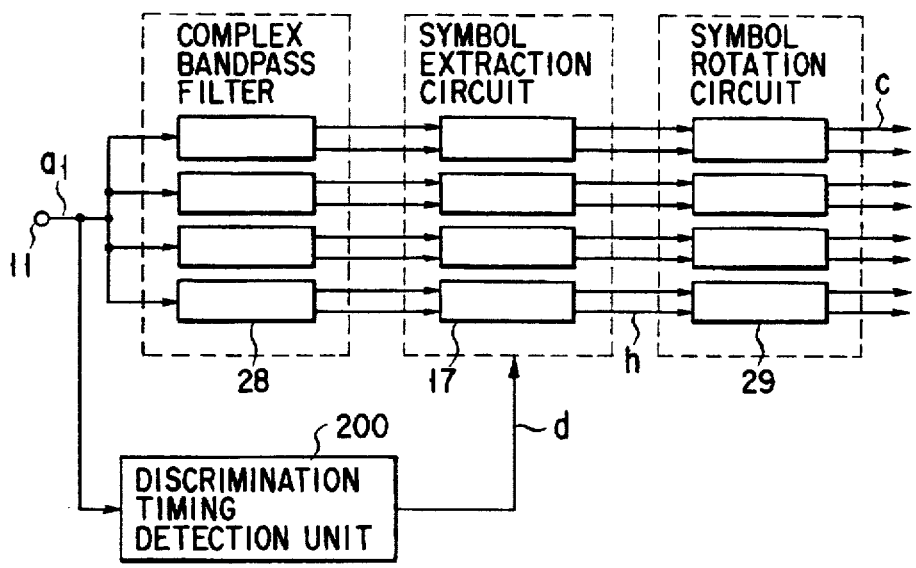
FIG. 5 is a block diagram showing the schematic arrangement of a digital signal demodulation apparatus according to the third embodiment of the present invention.

FIG. 5 is a block diagram showing the arrangement of a digital modulation signal demodulation apparatus according to the third embodiment of the present invention. The reference numerals as in the apparatus of the second embodiment in FIG. 4 denote the same parts in FIG. 5, and a repetitive description will be omitted.

A synchronous detection circuit 12 is removed from the apparatus of the third embodiment. A received IF (intermediate frequency) signal $a_1$ input from an input terminal 11 is directly input to each complex bandpass filter 28 for each subcarrier. The amplitude of the received IF signal is detected by an amplitude detection unit 21 in a discrimination timing detection circuit 200. Assuming that the IF frequency is $\omega_{IF}$, the received IF signal $a_1$ has the modulated signal components of subcarrier frequencies $\omega_{IF}+\omega_1$, $\omega_{IF}+\omega_2$, $\omega_{IF}+\omega_3$, and $\omega_{IF}+\omega_4$.

The passing center frequencies of the complex bandpass filters 28 are set at the subcarrier frequencies $\omega_{IF}+\omega_1$, $\omega_{IF}+\omega_2$, $\omega_{IF}+\omega_3$, and $\omega_{IF}+\omega_4$, respectively. Each complex bandpass filter 28 extracts only a modulated signal component corresponding to each subcarrier from the received IF signal $a_1$.

Each complex bandpass filter 28 receives the received IF signal $a_1$ of a real number. The complex bandpass filter 28 executes the complex bandpass filter operation for this received IF signal $a_1$ to output a complex received signal consisting of an in-phase component I(t) and a quadrature component Q(t) for each subcarrier. Each symbol extraction circuit 17 extracts a signal value of the complex received signal at a symbol discrimination timing d to output a complex received symbol h, as shown in FIG. 7.

The complex received symbol h is not quadrature-demodulated with a corresponding subcarrier. The complex received symbol h rotates on the complex coordinate system at a speed corresponding to one of the frequencies $\omega_{IF}+\omega_1$, $\omega_{IF}+\omega_2$, $\omega_{IF}+\omega_3$, and $\omega_{IF}+\omega_4$.

The rotating complex received symbol h is sent to a symbol rotation circuit 29 corresponding to each subcarrier. The symbol rotation circuit 29 multiples the complex received symbol h by a reversely rotating correction complex number to stop the rotation of a complex received signal h.

The complex received symbol h which is stopped rotating is output as in-phase and quadrature demodulated symbols c.

In the digital modulation signal demodulation apparatus having the above arrangement, the frequency of a signal input to each complex bandpass filter 28 is higher than that in the apparatus of the second embodiment shown in FIG. 4, so that the sampling rate and the arithmetic processing amount are increased. However, the synchronous detection circuit 12 can be removed to further simplify the overall arrangement of the digital modulation signal demodulation apparatus.

Note that the present invention is not limited to the apparatuses of the above embodiments. In the apparatus of each embodiment, the subcarrier separation circuit 13, the baseband filters 16, the symbol extraction circuits 17, the complex bandpass filters 26 (28), the symbol rotation circuits 27 (29), and the discrimination timing detection circuit 200 are realized by a software means using computer programs. However, these circuits may be realized by hardware circuits.

In the above embodiments, the quadrature demodulation apparatus for demodulating a signal modulated by a M16QAM scheme is used in the digital modulation signal demodulation apparatus. However, the subcarrier-modulation scheme is not limited to the quadrature amplitude modulation (QAM) scheme. For example, a demodulation apparatus for demodulating a signal modulated by a QPSK scheme for modulating each subcarrier may be used.

As described above, in the digital signal demodulation apparatus according to the first mode of the present invention, the symbol discrimination timing is determined on the basis of a correlation value between the prestored reference amplitude and the amplitude of a subcarrier-synthesized signal before separation. Therefore, demodulated signals obtained by separating and demodulating the subcarrier-synthesized signal need not be used. A highly accurate symbol discrimination timing can be set. In addition, this simple digital signal demodulation apparatus can be applied for a high-speed digital modulated signal. The demodulation processing speed can also be greatly increased.

Further, in the first mode of the present invention, the complex bandpass filter operation is directly performed to the subcarrier-synthesized IF or IQ signal which is not quadrature-demodulated with an IF frequency or a subcarrier frequency. For this reason, a subcarrier separation circuit in which complicated demodulation conversion processing must be executed can be removed, thereby increasing the demodulation processing efficiency with a simple arrangement.

Embodiments included in the second mode of the present invention will be generally described below.

According to the fourth embodiment of the present invention, a digital modulation signal demodulation apparatus for obtaining demodulated signals in units of subcarriers from a subcarrier-synthesized signal serving as a received signal modulated by a multi-subcarrier modulation scheme comprises: a phase detection means for detecting a phase of the subcarrier-synthesized signal at a predetermined portion; a reference phase storage means for prestoring a reference phase identical to the phase of the subcarrier-synthesized signal at the predetermined portion; a phase difference calculation means for calculating a phase difference between the phase detected by the phase detection means and the reference phase; an offset amount calculation means for calculating an offset amount of a carrier frequency from the phase difference calculated by the phase difference calculation means; and a frequency offset correction means for correcting a frequency offset amount included in the subcarrier-synthesized signal using the calculated offset amount.

According to the fifth embodiment of the present invention, a digital modulation signal demodulation apparatus for quadrature-demodulating a received signal modulated by a multi-subcarrier modulation scheme into a subcarrier-synthesized signal including in-phase and quadrature components to obtain demodulated signals in units of subcarriers comprises: a reference signal storage means for prestoring reference signals identical to signals of the in-phase and quadrature components at predetermined portions; a phase difference calculation means for calculating a phase difference signal including phase differences between the reference signals and the in-phase and quadrature components of the subcarrier-synthesized signal; an offset amount calculation means for calculating an offset amount of a carrier frequency from the phase difference signal calculated by the phase difference calculation means; and a frequency offset correction means for correcting a frequency offset amount included in the subcarrier-synthesized signal using the calculated offset amount.

In the digital modulation signal demodulation apparatus having the above arrangement according to the fourth embodiment of the present invention, the subcarrier-synthesized signal obtained from, e.g., the received signal consists of an in-phase component I(t) and a quadrature component Q(t). Note that each of these in-phase component I(t) and quadrature component Q(t) includes signals modulated with subcarrier frequencies centered on a frequency O.

A phase $\theta(t)$ of the subcarrier-synthesized signal including the in-phase component I(t) and the quadrature component Q(t) is represented by an angle between the in-phase component I(t) and the quadrature component Q(t) on the complex coordinate system as follows:

$$\text{phase } \theta(t)=\tan^{-1}\{Q(t)/I(t)\}$$

When a carrier frequency $\omega_C$ of the received signal has a frequency offset $\omega_{OS}$, this subcarrier-synthesized signal also includes an offset frequency $\omega_{OS}$. As a result, the phase $\theta(t)$ also changes in accordance with the offset frequency $\omega_{OS}$ value.

When the data form of the received signal is a form in which data to be transmitted is incorporated in a transmission slot and sent, this transmission slot incorporates various fixed data in addition to the data to be transmitted.

A position, corresponding to the fixed data, in a reference received signal free from the frequency offset ($\omega_{OS}=0$) of the carrier frequency $\omega_C$ is defined as a predetermined position. A phase $\theta(t)$ of the subcarrier-synthesized signal at this predetermined position corresponding to the reference received signal is stored and held as a reference phase $\theta_S(t)$.

A phase difference $\Delta\theta$ between the phase $\theta(t)$ of the received signal at the predetermined position and the stored and held reference phase $O_S(t)$ at the identical position is calculated. In general, a change in the phase difference between two signals at a constant ratio indicates the presence of a frequency difference between the two signals. Therefore, a frequency difference between the reference received signal and an actually received signal, i.e., the offset frequency $\omega_{OS}$ can be obtained by time-differentiating the calculated phase difference $\Delta\theta$.

When the offset frequency $\omega_{OS}$ is calculated from the subcarrier-synthesized signal, the frequency offset of the subcarrier-synthesized signal can be corrected by the frequency offset correction means using this offset frequency $\omega_{OS}$ according to the same operation procedures.

In such a technique, the offset frequency $\omega_{OS}$ can be directly detected from the subcarrier-synthesized signal which is not demodulated by a subcarrier separation circuit or a baseband filter. Therefore, even if a large offset frequency $\omega_{OS}$ which cannot be correctly processed by the subcarrier separation circuit or the baseband filter is generated, this frequency offset can be properly corrected.

In the fifth embodiment of the present invention, the reference signals $I_S(t)$ and $Q_S(t)$ respectively consisting of the in-phase and quadrature components of the subcarrier-synthesized signal is prestored. A phase difference signal including phase differences between the in-phase component I(t) and the quadrature component Q(t) of the subcarrier-synthesized signal and the prestored reference signals is calculated. The offset amount of a carrier frequency is calculated by the offset amount calculation means using this phase difference signal. Finally, the frequency offset amount can be corrected using this offset amount.

The embodiments included in the second mode of the present invention will be described below in detail with reference to the accompanying drawings.

Figure 8:
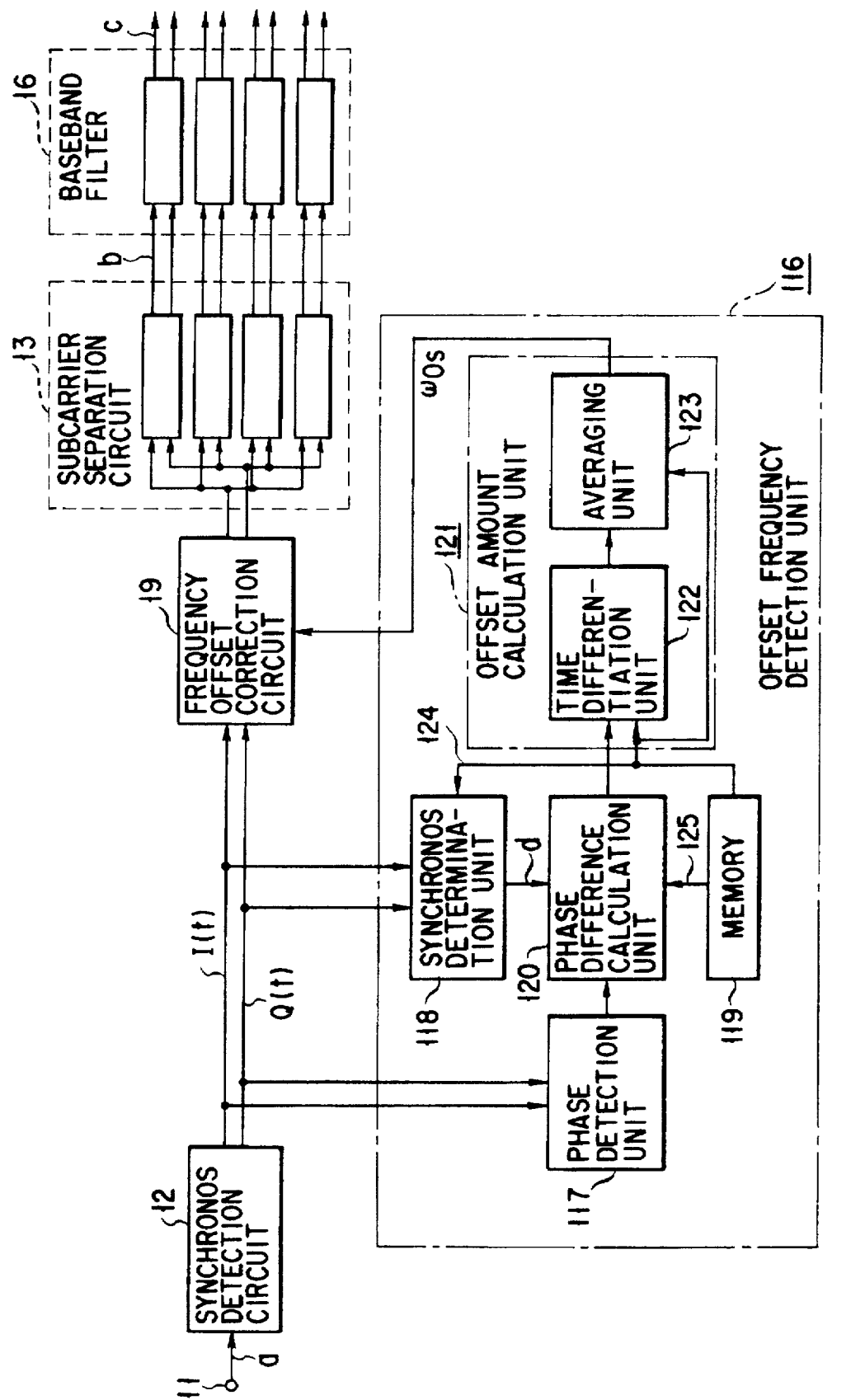
FIG. 8 is a block diagram showing the arrangement of a digital signal demodulation apparatus according to the fourth embodiment of the present invention.
Figure 29:
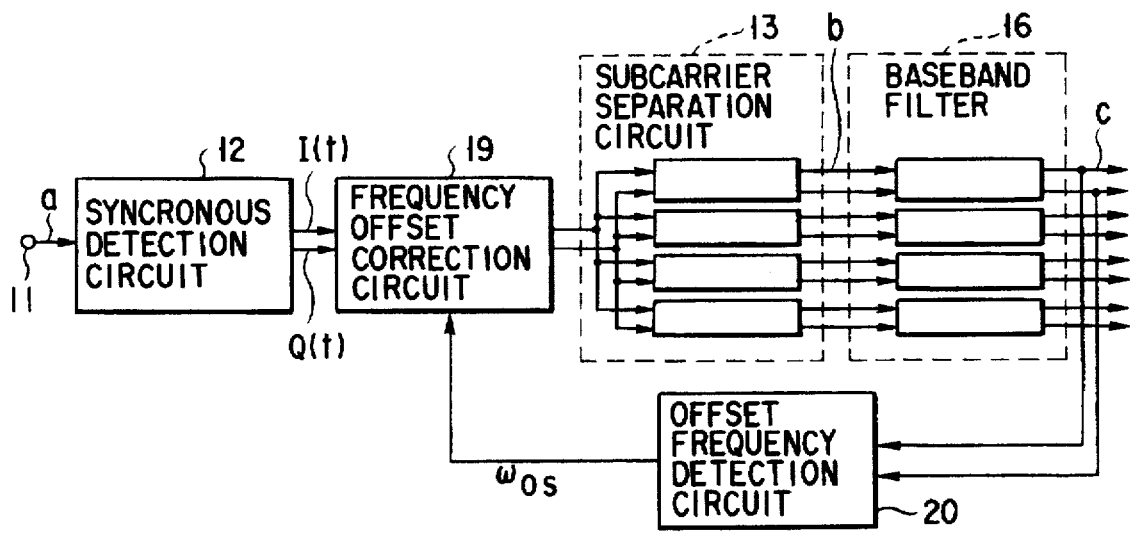
FIG. 29 is a block diagram showing the arrangement of another conventional digital signal demodulation apparatus.

FIG. 8 is a block diagram showing the arrangement of a digital signal demodulation apparatus of the fourth embodiment. The reference numerals as in the conventional digital signal demodulation apparatus in FIG. 29 denote the same parts in FIG. 8, and a repetitive description will be omitted.

A received signal a quadrature-modulated by a multi-subcarrier modulation scheme and input through an input terminal 11 is input to a synchronous detection circuit 12. This synchronous detection circuit 12 quadrature-demodulates the received signal a with a carrier frequency $\omega_C$ of this received signal a and outputs a subcarrier-synthesized signal consisting of an in-phase component I(t) and a quadrature component Q(t). This subcarrier-synthesized signal, therefore, contains an offset frequency based on a difference between a carrier frequency of the received signal a and a synchronous detection frequency of the synchronous detection circuit 12.

The frequency offset of the subcarrier-synthesized signal is corrected by a frequency offset correction circuit 19 connected to the output of the synchronous detection circuit 12. The obtained subcarrier-synthesized signal is input to a subcarrier separation circuit 13. The subcarrier separation circuit 13 quadrature-demodulates the input subcarrier-synthesized signal for each subcarrier with a corresponding frequency to output a demodulated signal b, as in the conventional subcarrier separation circuit 13 shown in FIG. 29.

Each demodulated signal b corresponding to each subcarrier and output from the subcarrier separation circuit 13 is input to a baseband filter 16 corresponding to the subcarrier.

Figures 12A, 12B:
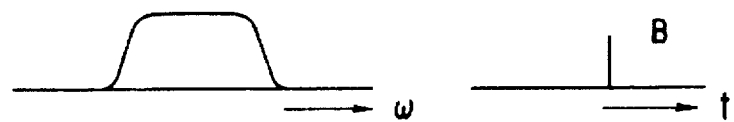
FIGS. 12A, 12B, and 12C are views for explaining an operation of a baseband filter in the apparatus of the fourth embodiment.
Figure 12C:
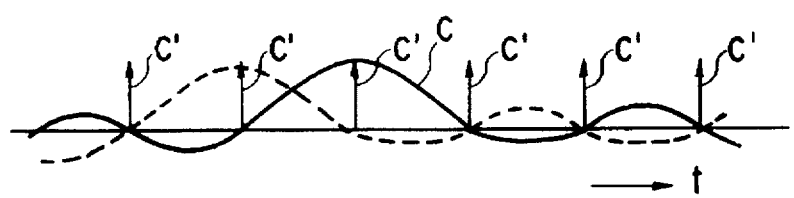

The cascade characteristics of each baseband filter 4 in the modulation apparatus and each baseband filter 16 in the demodulation apparatus has the time response characteristic shown in FIG. 12C when an impulse signal B shown in FIG. 12B is input to, e.g., a filter having a frequency characteristic shown in, e.g., FIG. 12A.

When the baseband filter 4 in the modulation apparatus has root Nyquist characteristics, the corresponding baseband filter 16 in the demodulation apparatus executes the root Nyquist filter operation for a corresponding demodulated signal b to output a demodulated symbol c which does not interfere with other symbols c, as shown in FIG. 12C.

The subcarrier-synthesized signal including the in-phase component I(t) and the quadrature component Q(t) and output from the synchronous detection circuit 12 is input to the frequency offset correction circuit 19 and at the same time to an offset frequency detection unit 116.

This offset frequency detection unit 116 has a phase detection unit 117, a synchronous determination unit 118, a memory 119, a phase difference calculation unit 120, and an offset amount calculation unit 121, as shown in FIG. 8. Note that the offset amount calculation unit 121 is constituted by a time differentiation unit 122 and an averaging unit 123.

The phase detection unit 117 detects a phase $\theta$ of the subcarrier-synthesized signal including the in-phase component I(t) and the quadrature component Q(t) output from the synchronous detection circuit 12. More specifically, the phase detection unit 117 calculates the phase $\theta$ using an angle between the in-phase component I and the quadrature component Q.

phase $\theta(t) = \tan^{-1}\{Q(t)/I(t)\}$

The phase detection unit 117 sends sequentially detected phases $\theta(t)$ to the phase difference calculation unit 120 connected to the output of the phase detection unit 117.

On the other hand, the data form of the received signal a quadrature-modulated by a multi-subcarrier modulation scheme has a transmission slot (upper stage of FIG. 9A) obtained by simplifying the format (FIG. 27) as the standards (RCR STD-32, Research & Development Center for Radio Systems) of the digital MCA system in the communication system incorporating the apparatus of this embodiment.

In these standards, one transmission slot (basic uplink slot) has 60 symbols. A preamble is set in the first five symbols, and a one-symbol ramp portion follows the preamble. Synchronization symbols SY1 to SY3 are set for the following three symbols, respectively. Data symbols to be transmitted are sequentially set following these synchronization symbols SY1 to SY3. Several pilot symbols PL are inserted between data symbols. A one-symbol ramp portion is set at the end of the transmission slot.

Of these symbols, 53 symbols except to the preamble and the ramp portion are effective transmitting symbols.

Figure 9A:
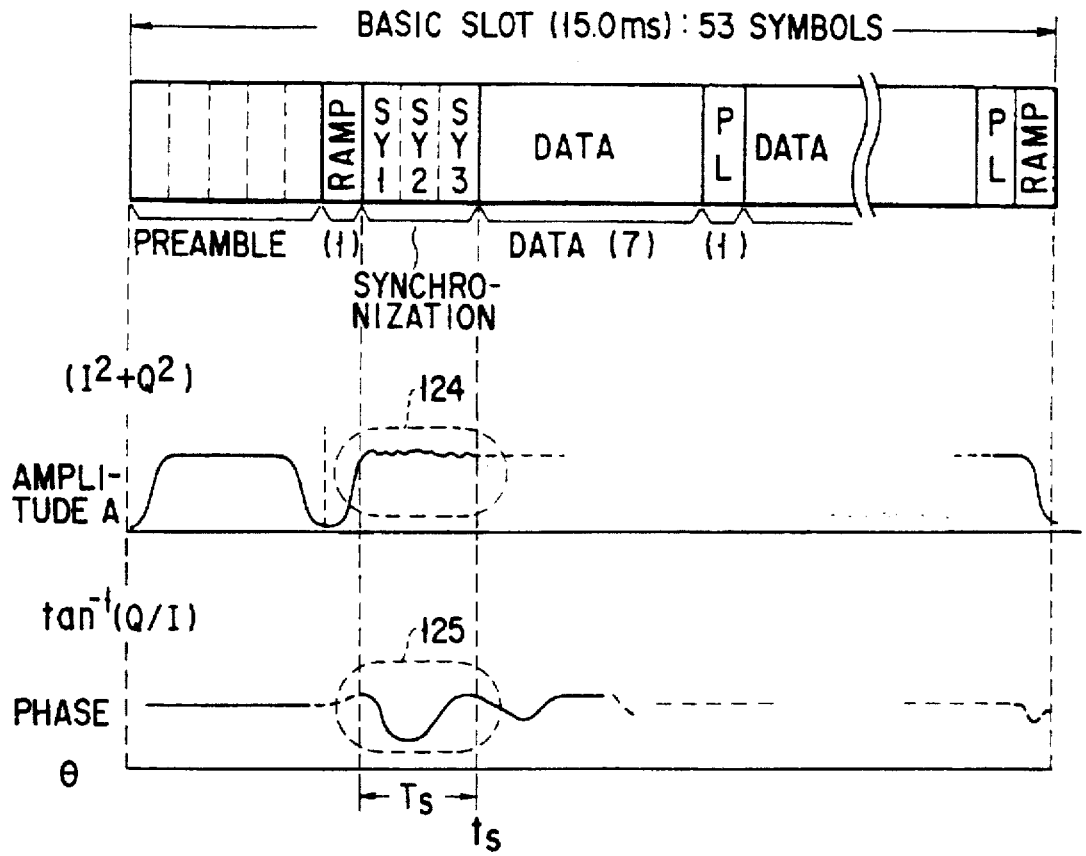
FIGS. 9A and 9B are views showing a relationship between the format of a received signal and memory contents in the apparatus of the fourth embodiment.

The received signal a having this transmission slot is demodulated by the synchronous detection circuit 12, and an amplitude A (square value as $I^2+Q^2$) of the resultant subcarrier-synthesized signal from the synchronous detection circuit 12 changes as shown in the middle stage of FIG. 9A. This amplitude value, of course, changes depending on each symbol.

Similarly, the phase θ(t) of the subcarrier-synthesized signal demodulated by the synchronous detection circuit 12 also changes as shown in the lower stage of FIG. 9A. This phase value, of course, changes in accordance with each symbol value.

In this transmission slot, all the values except for the data symbols to be transmitted are eigenvalues. Therefore, the amplitude waveform and the phase waveform which correspond to the eigenvalue are nearly eigenvalues.

In this embodiment, of all the eigenvalues of the received signal a, the three synchronization symbols SY1 to SY3 of the seventh symbol to the ninth symbol are used as reference symbols, and an envelope waveform of a time $T_S$ of the amplitude value of the subcarrier-synthesized signal obtained by demodulating the demodulated received signal a, which amplitude waveform corresponds to the reference symbols, is prestored as a reference amplitude waveform 124 in a memory 119. Similarly, a phase θ(t) corresponding to the same reference symbols, i.e., a waveform of the time $T_S$ of a reference phase $θ_S(t)$ is stored as a reference phase waveform 125 in the memory 119.

Figure 9B:
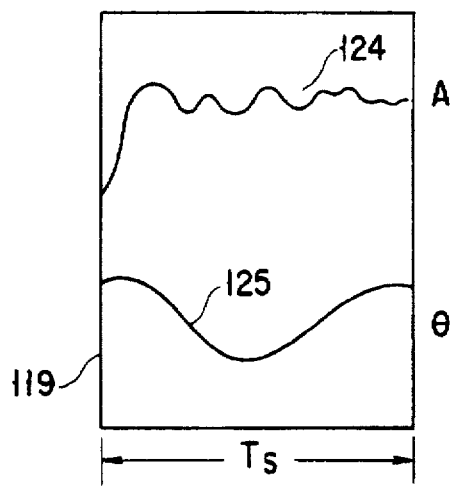

The reference amplitude waveform 124 and the reference phase waveform 125 as shown in FIG. 9B, which are stored in the memory 119, are waveforms corresponding to a reference received signal free from a frequency offset ($ω_{OS}$= 0).

Figure 10:
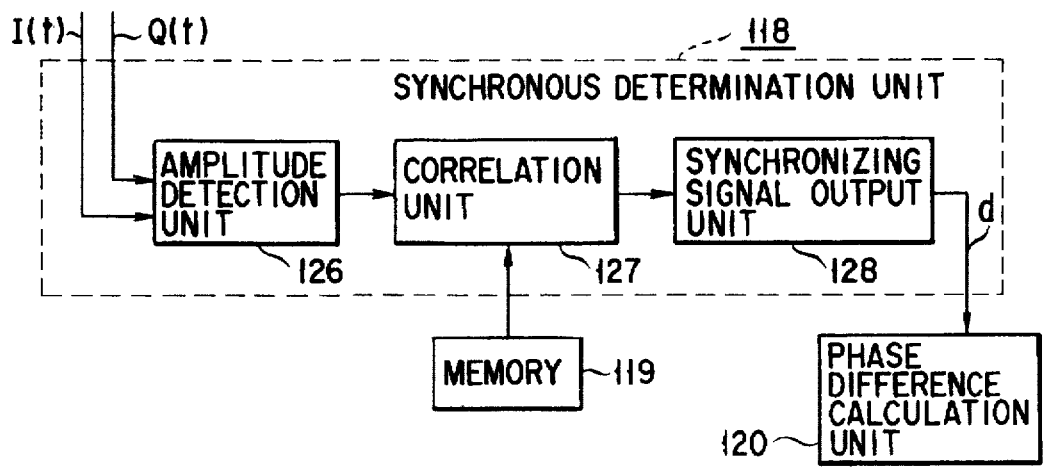
FIG. 10 is a block diagram showing the arrangement of a synchronous determination unit in the apparatus of the fourth embodiment.

The synchronous determination unit 118 is constituted by, e.g., an amplitude detection unit 126, a correlation unit 127, and a synchronizing signal output unit 128, as shown in FIG. 10.

The amplitude detection unit 126 detects the amplitude of the subcarrier-synthesized signal consisting of the in-phase component I(t) and the quadrature component Q(t) and output from the synchronous detection circuit 12. More specifically, the amplitude detection unit 126 calculates the square value ($I^2+Q^2$) of the amplitude using the in-phase component I and the quadrature component Q.

Amplitude values sequentially output from the amplitude detection unit 126 are input to the correlation unit 127 connected to the output of the amplitude detection unit 126. The correlation unit 127 receives the reference amplitude waveform 124 of the time $T_S$ from the memory 119. At a predetermined sampling period, the correlation unit 127 sequentially extracts the measurement amplitude waveform of the latest amplitude value of the time $T_S$ from the amplitude values sequentially input from the amplitude detection unit 126 and sequentially calculates correlation values between the reference amplitude waveform 124 and the sequentially extracted measurement amplitude waveforms.

The synchronizing signal output unit 128 detects sampling time $t_S$ representing a maximum value of correlation values. At this sampling time $t_S$, the waveform of the received signal a is synchronized with the reference amplitude waveform 124 stored in the memory 119. The synchronizing signal output unit 128 outputs a synchronous detection signal d to the phase difference calculation unit 120 at the sampling time $t_S$.

When the waveform of the received signal a is synchronized with the reference phase waveform 125 stored in the memory 119, the synchronous detection signal d is input to the phase difference calculation unit 120. The phase difference calculation unit 120 sequentially calculates phase differences Δθ(t) between sequentially input phases (detected phases) θ(t) and the corresponding reference phases $θ_S(t)$ on the reference phase waveform 125 and sends the phase differences Δθ(t) to the time differentiation unit 122 of the offset amount calculation unit 121.

The time differentiation unit 122 time-differentiates this phase difference Δθ to calculate a frequency difference between the reference received signal stored in the memory 119 and the practically received signal a, i.e., an offset frequency $ω_{OS}$ of the main carrier frequency $ω_C$ of the received signal a.

The time-differentiated value of the phase difference Δθ obtained by the time differentiation unit 122, i.e., the offset frequency $ω_{OS}$ is sent to the next averaging unit 123.

The averaging unit 123 averages sequentially input offset frequencies $ω_{OS}$ of the time $T_S$. In general, when the amplitude of a measurement signal is small, the phase error increases. For this reason, the averaging unit 123 receives a reference amplitude value at time t from the memory 119. The averaging unit 123 weights each offset frequency $ω_{OS}$ with an amplitude A and calculates a weighted mean. In this manner, the weighted average of the offset frequencies $ω_{OS}$ is calculated to compress errors caused by the amplitude variations.

The averaging unit 123 sends the calculated offset frequency $ω_{OS}$ to the frequency offset correction circuit 19.

Figure 11:
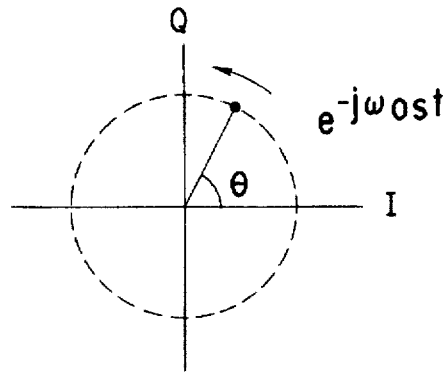
FIG. 11 is a schematic view showing a rotation operation of a subcarrier-synthesized signal in the apparatus of the fourth embodiment.

The frequency offset correction circuit 19 multiples the subcarrier-synthesized signal consisting of the in-phase component I(t) and the quadrature component Q(t) and output from the synchronous detection circuit 12 by a correction signal $\exp(-jω_{OS}t)$ for rotating the subcarrier-synthesized signal in a direction to cancel the rotation caused by the offset frequency components $ω_{OS}$, as shown in FIG. 11. With this operation, the offset frequency components $ω_{OS}$ are removed from the subcarrier-synthesized signal.

The subcarrier-synthesized signal whose frequency offset is corrected is input to the subcarrier separation circuit 13 connected to the output of the frequency offset correction circuit 19. As a result, each baseband filter 16 outputs the correct demodulated symbol c.

In the digital modulation signal demodulation apparatus having the above arrangement, the offset frequency $ω_{OS}$ is directly detected from the subcarrier-synthesized signal which is not demodulated by the subcarrier separation circuit 13 or the baseband filter 16.

Even if a large offset frequency $ω_{OS}$ which cannot be correctly processed by the subcarrier separation circuit 13 or the baseband filter 16 is generated, this frequency offset can be properly corrected.

The offset frequency detecting n unit 116 for detecting the offset frequency $ω_{OS}$ processes the same subcarrier-synthesized signal as that for the frequency offset correction circuit 19 for correcting the frequency offset using the detected offset frequency $ω_{OS}$. No signal processing circuit for the subcarrier-synthesized signal is inserted between the offset frequency detection unit 116 and the frequency offset correction circuit 19.

This digital modulation signal demodulation apparatus, therefore, can cope with an abrupt change in the offset frequency components $ω_{OS}$ of the carrier frequency of $ω_C$ of the received signal a at high speed. The subcarrier-synthesized signal free from a frequency offset can always be supplied to the subcarrier separation circuit 13 and the baseband filter 16.

Even if a large offset frequency $\omega_{OS}$ is generated, the baseband filter 16 can always output the correct demodulated symbol c. As a result, the demodulation accuracy of the signal demodulation apparatus can be increased.

Figure 13:
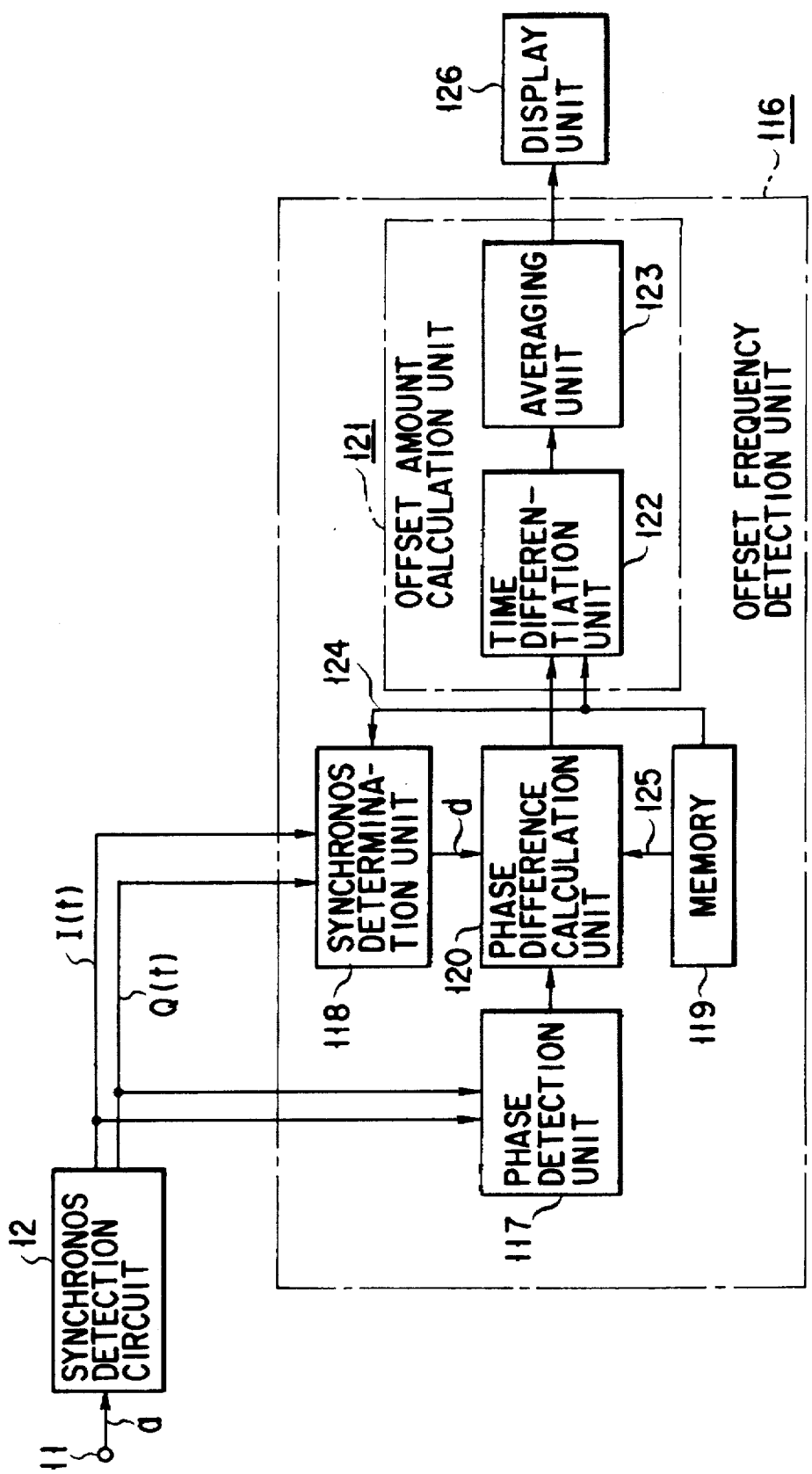
FIG. 13 is a block diagram showing the arrangement of an offset frequency measurement apparatus arranged using the present invention.

FIG. 13 is a block diagram showing the schematic arrangement of an offset frequency measurement apparatus arranged using the above techniques. The same reference numerals as in the signal demodulation apparatus of the embodiment shown in FIG. 8 denote the same parts in FIG. 13, and a repetitive description will be omitted.

In this offset frequency measurement apparatus, the frequency offset correction circuit 19, the subcarrier separation circuit 13, and the baseband filter 16 in the digital modulation signal demodulation apparatus in FIG. 8 are omitted, and instead a display unit 126 such as a CRT display device is added.

In the offset frequency measurement apparatus having the above arrangement, a received signal a input from an input terminal 11 is quadrature-modulated with a main carrier frequency $\omega_C$ in a synchronous detection circuit 12 into a subcarrier-synthesized signal including an in-phase component I(t) and a quadrature component Q(t). An offset frequency $\omega_{OS}$ of the subcarrier-synthesized signal output from the synchronous detection circuit 12 is detected by an offset frequency detection unit 116 with respect to the carrier frequency $\omega_C$. For example, the offset frequency $\omega_{OS}$ is graphically displayed on the display unit 126.

In the offset frequency measurement apparatus having the above arrangement can accurately measure a large offset frequency $\omega_{OS}$ with respect to the carrier frequency $\omega_C$.

Figures 14A, 14B:
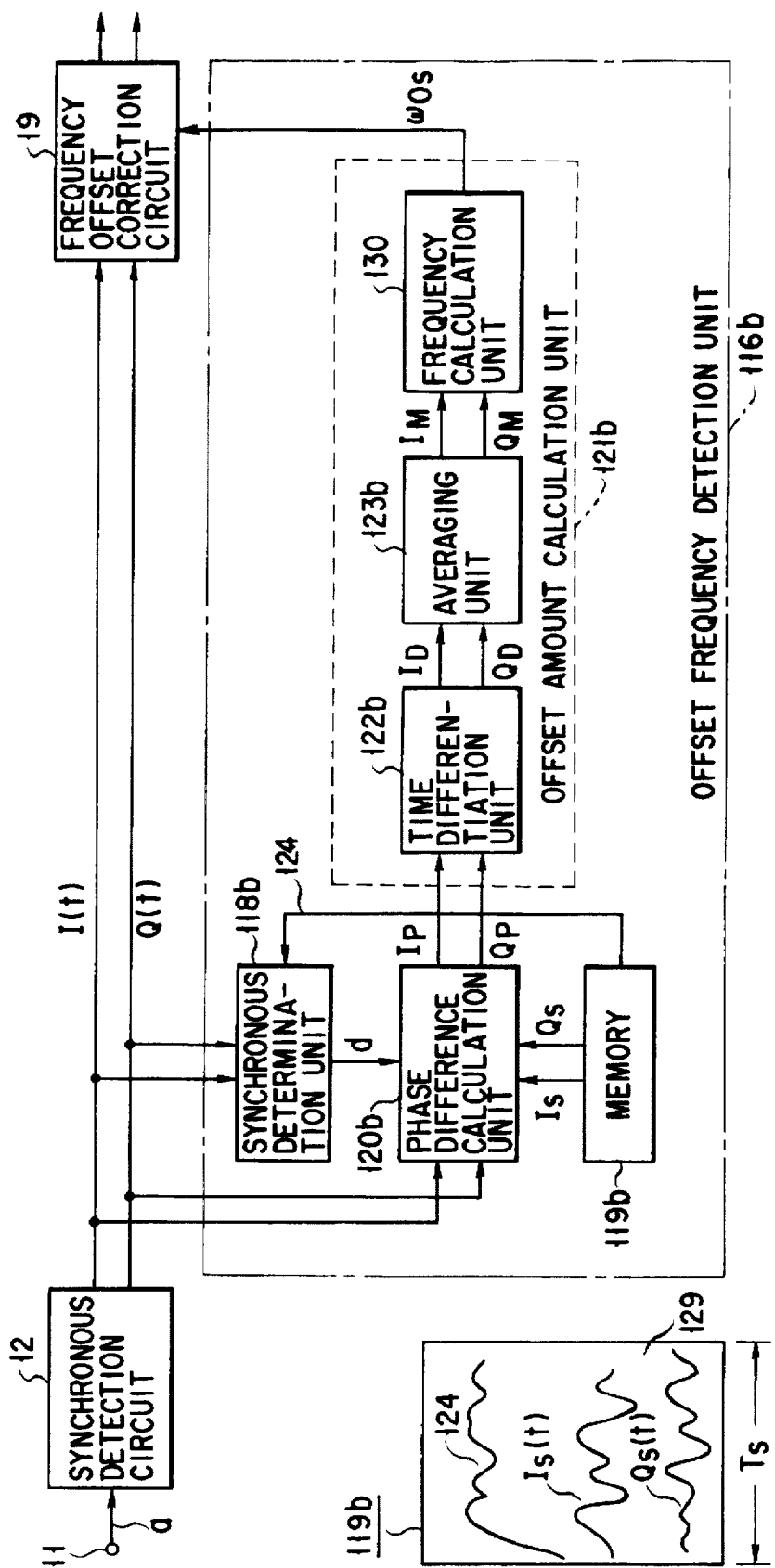
FIGS. 14A and 14B are a block diagram showing the main part of a digital signal demodulation apparatus according to the fifth embodiment of the present invention, and a chart showing a memory waveform used in the apparatus.

FIG. 14A is a block diagram showing the main part of a digital modulation signal demodulation apparatus according to the fifth embodiment of the present invention. An arrangement except for an offset frequency detection unit 116b is the same as that of the apparatus shown in FIG. 8. In the fifth embodiment, a repetitive description will be omitted, and the arrangement and operation of the offset frequency detection unit 16b will be described below.

In the apparatus of the fifth embodiment, three synchronization symbols SY1 to SY3 from the seventh symbol to the ninth symbol of the received signal a are defined as reference symbols, and a waveform of a time $T_S$ of the amplitude value for the reference symbol in the subcarrier-synthesized signal upon reception of the received signal is prestored as a reference amplitude waveform 124 in a memory 119b.

Waveforms of the time $T_S$ of the in-phase component I(t) and the quadrature component Q(t) of the subcarrier-synthesized signals corresponding to the identical reference symbols SY1 to SY3, i.e., the reference signals $I_S(t)$ and $Q_S(t)$ are stored as reference signal waveforms 129 in the memory 119b. The reference signal waveforms 129 stored in the memory 119b are waveforms free from frequency offsets ($\omega_{OS}=0$).

The synchronous detection unit 118b has the same function as that of the synchronous detection unit 118 in FIG. 8 and outputs a synchronous detection signal d.

When a phase difference detection unit 120b receives the synchronous determination signal d, the in-phase component I(t) and the quadrature component Q(t) of the subcarrier-synthesized signal are time-synchronized with the reference signal waveforms 129 ($I_S(t)$ and $Q_S(t)$) stored in the memory 119b. These components and reference signal waveforms are aligned with time t and subjected to the following operations:

$$I_P(t)=I(t)\cdot I_S(t)+Q(t)\cdot Q_S(t)$$

$$Q_P(t)=Q(t)\cdot I_S(t)-I(t)\cdot Q_S(t)$$

In this case, $\tan^{-1}\{Q_P(t)/I_P(t)\}$ represents phase differences between the received subcarrier-synthesized signal (I(t) and Q(t)) and the reference signal waveforms $I_S(t)$ and $Q_S(t)$. For this reason, the phases of $I_P(t)$ and $Q_P(t)$ are values representing the phase differences. The amplitudes of $I_P(t)$ and $Q_P(t)$ are products between the amplitudes of I(t) and Q(t) and the amplitudes of $I_S(t)$ and $Q_S(t)$.

The phase difference calculation unit 120b sends $I_P(t)$ and $Q_P(t)$ to a time differentiation unit 122b in an offset amount calculation unit 121b.

The time differentiation unit 122b performs the following operations for $I_P(t)$ and $Q_P(t)$:

$$I_D(t)=I_P(t+\Delta t)I_P(t)+Q_P(t+\Delta t)Q_P(t)$$

$$Q_D(t)=Q_P(t+\Delta t)I_P(t)-I_P(t+\Delta t)Q_P(t)$$

In this case, $\tan^{-1}\{Q_D(t)/I_D(t)\}$ represents a phase difference between $\{I_P(t+\Delta_t)$ and $Q_P(t+\Delta t)\}$ and $\{I_P(t)$ and $Q_P(t)\}$. The phases of $I_D(t)$ and $Q_D(t)$ are values representing the time differences of the phase differences. The amplitudes of $I_D(t)$ and $Q_D(t)$ are the products of the amplitudes of $I_P(t+\Delta t)$ and $Q_P(t+\Delta t)$ and the amplitudes of $I_P(t)$ and $Q_P(t)$. The time differentiation unit 122b sends $I_D(t)$ and $Q_D(t)$ to an averaging unit 123b.

The averaging unit 123b time-averages $I_D(t)$ and $Q_D(t)$ and outputs averaged values $I_M$ and $Q_M$. The phases of $I_D(t)$ and $Q_D(t)$ are time differences, and their amplitudes are products of the amplitudes of $I(t+\Delta t)$ and $Q(t+\Delta t)$, the amplitudes of $I_S(t+\Delta t)$ and $Q_S(t+\Delta t)$, the amplitudes of I(t) and Q(t), and the amplitudes of $I_S(t)$ and $Q_S(t)$. Therefore, the time average is a mean weighted with the amplitude. In general, when the amplitude of a measurement signal is small, the phase measurement error increases. Errors caused by the amplitude variations can be reduced by the weighted averages.

A frequency calculation unit 130 calculates the weighted mean of the time difference of the phases of $I_M$ and $Q_M$, i.e., the phase differences, and divides the weighted mean by $\Delta t$ to obtain the offset frequency $\omega_{OS}$ by the following equation. The offset frequency $\omega_{OS}$ is output to the frequency offset correction circuit 19:

$$\omega_{OS}=\tan^{-1}(Q_M/I_M)/\Delta t$$

In the digital modulation signal demodulation apparatus having the above arrangement, since the offset frequency $\omega_{OS}$ can be detected by the offset frequency detection unit 116b, almost the same effect as in the apparatus of the embodiment shown in FIG. 8 can be obtained.

The present invention is not limited to each embodiment described above. In the apparatus of each embodiment, the parts constituting the frequency offset correction circuit 19, the subcarrier separation circuit 13, the baseband filter 16, and the offset frequency detection unit 116 are constituted by a software means using computer programs. However, these parts can be realized using hardware circuits.

In the digital modulation signal demodulation apparatus according to the second mode of the present invention, an offset frequency of the received signal from the carrier frequency is directly detected from the subcarrier-synthesized signal obtained prior to quadrature demodulation with the subcarrier frequency, and the frequency offset contained in the subcarrier-synthesized signal is corrected using the detected offset frequency.

According to the second mode of the present invention, the demodulated signal upon separation and demodulation of the subcarrier-synthesized signal need not be used. Even if a large offset frequency component is generated with respect to the symbol rate, the frequency offset can be properly corrected at a high response speed, and the wide range of frequency offsets can be coped with a simple arrangement.

An embodiment included in the third mode of the present invention will be generally described below.

A digital modulation signal demodulation apparatus according to the sixth embodiment of the present invention comprises: a provisional symbol discrimination timing detection means for detecting a provisional symbol discrimination timing of a received signal modulated by a multi-subcarrier modulation scheme; a provisional symbol demodulation means for demodulating the received signal for each subcarrier and outputting a demodulated received signal as a provisional demodulated symbol using the provisional symbol discrimination timing output from the provisional symbol discrimination timing detection means; a phase difference detection means for detecting a phase difference between a phase of the provisional demodulated symbol, at a predetermined position of the received signal, output from the provisional symbol demodulation means and a reference phase of the reference received signal at the predetermined position; and a symbol discrimination timing correction means for obtaining a time difference of the provisional symbol discrimination timing from a reference symbol discrimination timing on the basis of the phase difference detected for each subcarrier by the phase difference detection means and a frequency of the subcarrier, and correcting the provisional symbol discrimination timing on the basis of the time difference.

In the digital modulation signal demodulation apparatus having the above arrangement, the provisional symbol discrimination timing detection means detects the provisional symbol discrimination timing of the demodulated signal of the received signal in accordance with a variety of techniques including the above conventional technique. In addition, the provisional demodulated symbol is extracted using the provisional symbol discrimination timing from the signal obtained by demodulating the received signal for each subcarrier.

The phase of the provisional demodulated symbol at a predetermined position is detected. A phase difference between the detected phase and the reference phase of the demodulated symbol, at the reference position, of the theoretical reference received signal assumed to be correctly demodulated from the received signal is calculated.

This phase difference is caused by a time error between the provisional symbol discrimination timing and the reference symbol discrimination timing employed in extracting the correct demodulated symbol, the absolute phase of a carrier, and the offset of a carrier frequency. On the difference between subcarriers having a phase difference. Of these difference, differences caused by the carrier are canceled, so that an error caused by the symbol discrimination timing error is left.

The time error amount, i.e., the time difference can be obtained by dividing the difference between subcarriers having a phase difference by the difference in subcarrier frequency of the received signal.

The time difference is subtracted from the provisional symbol discrimination timing to obtain a correct symbol discrimination timing.

With this arrangement, the provisional symbol discrimination timing detected by the provisional symbol discrimination timing detection means is corrected to the correct symbol discrimination timing by the symbol discrimination timing correction means. Therefore, in the provisional symbol discrimination timing detection means, unlike in the conventional circuit, a highly accurate symbol discrimination timing need not be calculated in the provisional symbol discrimination timing detection means. The symbol discrimination timing can be calculated within a short period of time.

A higher detection accuracy can be expected because the symbol discrimination timing is detected in two stages.

The sixth embodiment of the present invention will be described below in detail with reference to the accompanying drawings.

Figure 15:
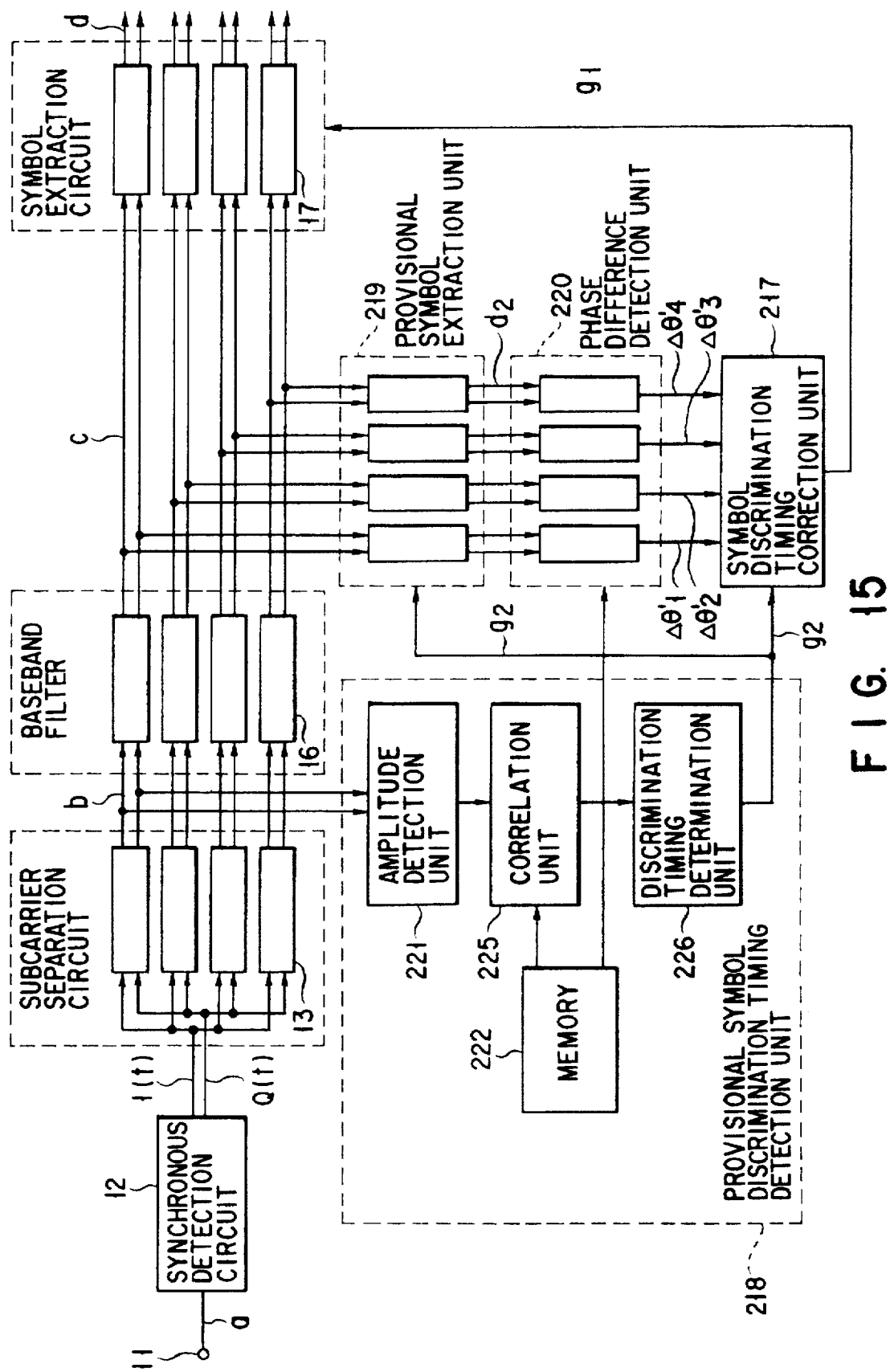
FIG. 15 is a block diagram showing the arrangement of a digital signal demodulation apparatus according to the sixth embodiment of the present invention.

FIG. 15 is a block diagram showing the schematic arrangement of a digital modulation signal demodulation apparatus of the sixth embodiment. The reference symbols denote the same parts as in the digital modulation signal demodulation apparatus incorporating the conventional symbol discrimination timing detection circuit 18 in FIG. 28, and a repetitive description will be omitted.

A synchronous detection circuit 12, subcarrier separation circuits 13, baseband filters 16, and symbol extraction circuits 17 are identical to those in the conventional digital signal demodulation apparatus shown in FIG. 28.

A received signal a quadrature-modulated by a multi-subcarrier modulation scheme and input through an input terminal 11 is input to the synchronous detection circuit 12. This synchronous detection circuit 12 quadrature-demodulates the received signal a with the carrier frequency $\omega_c$ and outputs a subcarrier-synthesized signal including an in-phase component I(t) and a quadrature component Q(t).

The subcarrier-synthesized signal is then input to each subcarrier separation circuit 13. The subcarrier-synthesized signal input to each subcarrier separation circuit 13 is quadrature-demodulated with a frequency of four frequencies $\omega_1$, $\omega_2$, $\omega_3$, and $\omega_4$ which corresponds to each subcarrier. Subcarrier signals except for the one are removed from the subcarrier-synthesized signal. Each demodulated signal b corresponding to each subcarrier and output from the corresponding subcarrier separation circuit 13 is input to a corresponding baseband filter 16.

Figures 17A, 17B:
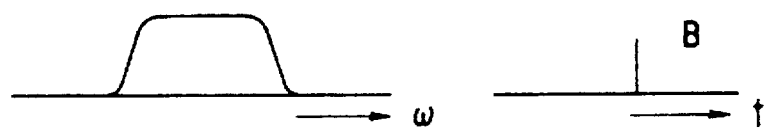
FIGS. 17A to 17C are views for explaining an operation of a baseband filter in the apparatus of the sixth embodiment.

The cascade characteristics of each baseband filter 4 in the modulation apparatus shown in FIG. 26 and each baseband filter 16 in the demodulation apparatus shown in FIG. 15 has a frequency characteristic shown in, e.g., FIG. 17A. At the same time, when an impulse signal B shown in FIG. 17B is input, the sum has the time response characteristic shown in FIG. 17C.

Figure 17C:
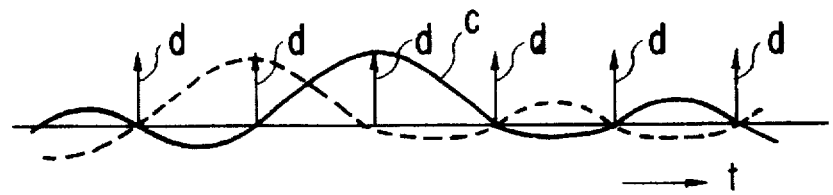

When the baseband filter 4 in the modulation apparatus has root Nyquist characteristics, the corresponding baseband filter 16 in the demodulation apparatus executes the root Nyquist filter operation for the corresponding demodulated signal b to output a demodulated signal c which does not interfere with other symbols d, as shown in FIG. 17C.

Each demodulated signal c output from each baseband filter 16 is input to a corresponding symbol extraction circuit 17. A corrected symbol discrimination timing $g_1$ from a symbol discrimination timing correction unit 217 is designated for each symbol extraction circuit 17. Of all the demodulated signals c input to the symbol extraction circuit 17, a signal value at a position designated by the symbol discrimination timing $g_1$ is sampled by the symbol extraction circuit 17. This sampled signal value is output as a final demodulated symbol d.

The symbol discrimination timing detection apparatus of this embodiment incorporated in the digital signal demodulation apparatus comprises a demodulation unit constituted by the synchronous detection circuit 12, the subcarrier separation circuits 13, and the baseband filters 16, a provisional symbol discrimination timing detection unit 218, a provisional symbol extraction unit 219, and a phase difference detection unit 220, and the symbol discrimination timing correction unit 217.

The demodulated signal b containing an in-phase component I and a quadrature component Q which correspond to one subcarrier from the given subcarrier separation circuit 13 is input to an amplitude detection unit 221 in the provisional symbol discrimination timing detection unit 218.

The amplitude detection unit 221 detects the amplitude of the demodulated signal b serving as the subcarrier-synthesized signal consisting of the in-phase component I and the quadrature component Q output from the subcarrier separation circuit 13. More specifically, the amplitude detection unit 221 calculates the square value ($I^2+Q^2$) of the amplitude using the in-phase component I and the quadrature component Q.

The data form of the received signal a quadrature-modulated by the multi-subcarrier modulation scheme has a transmission slot (upper stage of FIG. 16A) obtained by simplifying the format (FIG. 27) as the standards (RCR STD-32, Research & Development Center for Radio Systems) of the digital MCA system in the communication system incorporating the apparatus of this embodiment.

In these standards, one transmission slot (basic uplink slot) has 60 symbols. A preamble is set in the first five symbols, and a one-symbol ramp portion follows the preamble. Synchronization symbols SY1 to SY3 are set for the following three symbols, respectively. Data symbols to be transmitted sequentially follow these synchronization symbols SY1 to SY3. Several pilot symbols PL are inserted between data symbols. A one-symbol ramp portion is set at the end of the transmission slot.

Of these symbols, 53 symbols except to the preamble and the ramp portion are effective transmitting symbols.

The received signal a having this transmission slot is demodulated by the subcarrier separation circuits 13, and an amplitude A (square value as $I^2+Q^2$) of the resultant demodulated signal b from the subcarrier separation circuits 13 changes as shown in the lower stage of FIG. 16A. This amplitude value, of course, changes depending on each symbol value.

Similarly, a phase θ obtained from the demodulated symbol d extracted from the received signal a by the symbol extraction circuit 17 also changes. This phase value, of course, changes in accordance with each symbol value.

In this transmission slot, all the values except for the data symbols to be transmitted are eigenvalues. Therefore, the amplitude value and the phase value which correspond to the eigenvalues are also nearly eigenvalues.

In this embodiment, of all the eigenvalues of the received signal a, the three synchronization symbols SY1 to SY3 of the seventh symbol to the ninth symbol are used as reference symbols, and an envelope waveform of a time $T_S$ (a region B surrounded by the broken line) of the amplitude value of the demodulated signal b which corresponds to the reference symbols is stored as a reference amplitude waveform 223 in a memory 222 in advance.

The waveform positions of the reference amplitude waveform 223 and the symbol timings of the synchronization symbols SY1 to SY3 on the transmission slot have a one-to-one correspondence. Such a timing is stored as a symbol discrimination timing $g_0$ in the memory 222.

The phases θ of identical reference symbols, i.e., reference phases $θ_{S1}$, $θ_{S2}$, and $θ_{S3}$ of the synchronization symbols SY1, SY2, and SY3 are stored as reference phases 224 in the memory 222. Note that the reference phases $θ_{S1}$, $θ_{S2}$, and $θ_{S3}$ are set in units of subcarriers (e.g., $θ_{S1}=θ_{S11}$, $θ_{S12}$, $θ_{S13}$, $θ_{S14}$).

The reference phases 224 stored in the memory 222 correspond to theoretically calculated values when a theoretically correct symbol discrimination timing $g_0$ in the symbol extraction circuit 17 is given in the absence of the frequency offset.

The amplitude values A sequentially output from the amplitude detection unit 221 are input to a correlation unit 225 connected to the output of the amplitude detection unit 221. The correlation unit 225 also receives the reference amplitude waveform 223 of the time $T_S$ from the memory 222. The correlation unit 225 sequentially extracts the measurement amplitude waveform of the latest amplitude value of the time $T_S$ from the amplitude values sequentially input from the amplitude detection unit 221 and sequentially calculates correlation values between the reference amplitude waveform 223 and the sequentially extracted measurement amplitude waveforms. The correlation values are output to a discrimination timing determination unit 226 connected to the output of the correlation unit 225.

The discrimination timing determination unit 226 detects sampling time $t_S$ representing a maximum value of correlation values from the correlation unit 225. At this sampling time $t_S$, the received signal a is synchronized with the reference amplitude waveform 223 stored in the memory 222. The discrimination timing determination unit 226 then determines a sampling timing for the symbol discrimination timing $g_0$ before a time $(T_s-T_g)$ (lower stage of FIG. 16B) from the sampling time $t_S$ and outputs this symbol discrimination timing as a provisional symbol discrimination timing $g_2$ to the symbol discrimination timing correction unit 217 and the provisional symbol extraction unit 219.

On the other hand, each demodulated signal c output from each baseband filter 16 is supplied to the corresponding intrinsic symbol extraction circuit 17 and the corresponding provisional symbol extraction unit 219.

Each provisional symbol extraction unit 219 has the same arrangement as the intrinsic symbol extraction circuit 17 and receives the provisional symbol discrimination timing $g_2$ from the provisional symbol discrimination timing detection unit 218. Each provisional symbol extraction unit 219 samples a signal value at a position of the input demodulated signal c which is designated by the provisional symbol discrimination timing $g_2$ and outputs the samples signal value as each provisional demodulated symbol $d_2$.

Each provisional demodulated symbol d output from each symbol extraction unit 219 for each subcarrier is input to a corresponding phase difference detection unit 220 for each subcarrier.

Figure 18A:
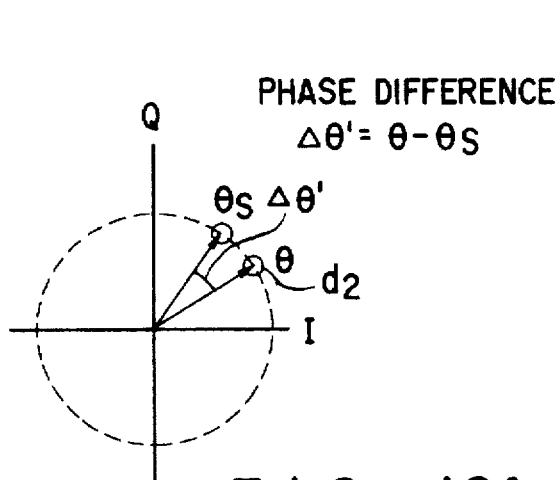
FIGS. 18A to 18C are views for explaining a process for calculating a time difference in the apparatus of the sixth embodiment.

Each phase difference detection unit 220 detects the phase θ of the corresponding provisional demodulated symbol $d_2$. For example, as shown in FIG. 18A, the phase θ is calculated as follows using an angle between the in-phase component I and the quadrature component Q constituting the provisional demodulated symbol $d_2$ on the complex coordinate system:

phase $θ=\tan^{-1}(Q/I)$

Each phase difference detection unit 220 calculates the phase of each subcarrier corresponding to the reference symbol. For example, phases $θ_{11}$, $θ_{12}$, $θ_{13}$, and $θ_{14}$ corresponding to the synchronization symbol SY1 in units of subcarriers are detected.

The respective phase difference detection units 220 calculate phase differences $Δθ_{11}'$, $Δθ_{12}'$, $Δθ_{13}'$, and $Δθ_{14}'$ between the phases $θ_{11}$, $θ_{12}$, $θ_{13}$, and $θ_{14}$ detected in units of subcarriers and the reference phases $θ_{S11}$, $θ_{S12}$, $θ_{S13}$, and $θ_{S14}$ corresponding to the same subcarrier and stored in the memory 222.

$\Delta\theta_{11}'=\theta_{11}-\theta_{S11}$, $\Delta\theta_{12}'=\theta_{12}-\theta_{S12}$,
$\Delta\theta_{13}'=\theta_{13}-\theta_{S13}$, $\Delta\theta_{14}'=\theta_{14}-\theta_{S14}$ Each phase difference detection unit 220 calculate the phase differences for the remaining synchronization symbols SY2 and SY3. The resultant phase differences $\Delta\theta_{11}'$, $\Delta\theta_{12}'$, $\Delta\theta_{13}'$, and $\Delta\theta_{14}'$, and resultant phase differences $\Delta\theta_{21}'$, $\Delta\theta_{22}'$, $\Delta\theta_{23}'$, $\Delta\theta_{24}'$, $\Delta\theta_{31}'$, $\Delta\theta_{32}'$, $\Delta\theta_{33}'$, and $\Delta\theta_{34}'$ are sent to the symbol discrimination timing correction unit 217.

Figure 18B:
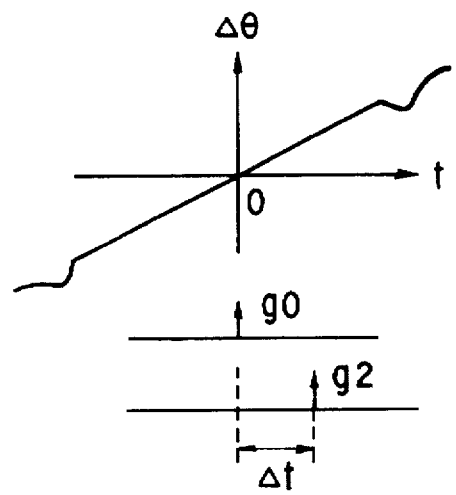

As shown in FIG. 18B, a time error between the theoretically correct reference symbol discrimination timing $g_0$ and the provisional symbol discrimination timing $g_2$, i.e., a time difference $\Delta t$, can be obtained as a value obtained by dividing the phase difference $\Delta\theta$ by the demodulation frequency, i.e., the subcarrier frequency $\omega$ in each subcarrier separation circuit 13.

$\Delta t_1 = \Delta\theta_1/\omega_1$, $\Delta t_2 = \Delta\theta_2/\omega_2$ $\Delta t_3 = \Delta\theta_3/\omega_3$, $\Delta t_4 = \Delta\theta_4/\omega_4$ In this case, since the time differences $\Delta t_1$ to $\Delta t_4$ of the subcarriers are equal to each other, the following equation is established:

$$\Delta_{t1} = \Delta t_2 = \Delta t_3 = \Delta t_4$$

Since the phases of carriers are not synchronized, it is impossible to detect the absolute phase of a subcarrier-synthesized signal. For this reason, the calculated phase difference $\Delta\theta'$ of the demodulated symbol contains a predetermined unknown phase offset $\theta_0$ as follows:

$$\Delta\theta' = \Delta\theta + \theta_0$$

When the carrier frequency has a small offset, the subcarrier-synthesized signal is rotated at the offset frequency over time. The above phase offset changes over time.

The calculated phase difference is generally represented as follows:

$$\Delta\theta_{ij}' = \Delta\theta_{ij} + \Delta\theta_{i0} (i=1, 2, 3, j=1, 2, 3, 4)$$

where $\theta_{ij}'$: the calculated phase difference $\theta_{ij}$: the absolute phase difference $\theta_{i0}$: the phase offset in symbol i i: the symbol number j: the subcarrier number For example, subcarriers 1 and 2 are used, the following equation is derived:

$$(\Delta\theta_{11}' - \Delta\theta_{12}')/(\omega_1 - \omega_2)$$
$$= \{(\Delta\theta_{11} - \Delta\theta_{10}) - (\Delta\theta_{12} - \Delta\theta_{10})\} - (\omega_1 - \omega_2)$$
$$= (\Delta\theta_{11} - \Delta\theta_{12})/(\omega_1 - \omega_2)$$

The symbol discrimination timing correction unit 217 calculates the time difference between the provisional symbol discrimination timing $g_2$ and the theoretically correct symbol discrimination timing $g_0$ by the following equation:

$$\Delta t = (\Delta\theta_{14}' - \Delta\theta_{13}')/(\omega_4 - \omega_3)$$

Figure 18C:
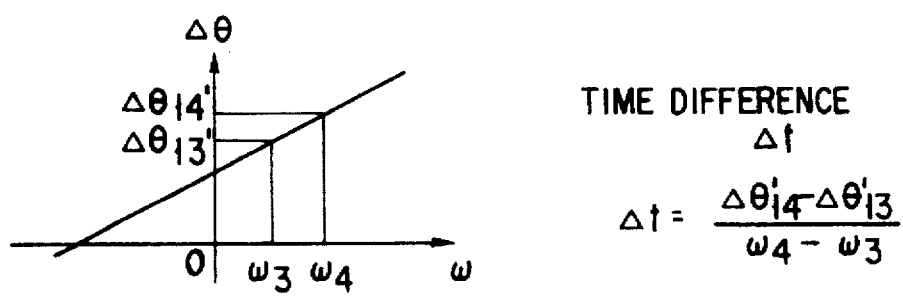

Since the above equation calculates the gradient of the phase difference with respect to the subcarrier frequency, a larger number of subcarriers are used to accurately obtain the gradient, i.e., $\Delta t$ in accordance with the method of least squares, as shown in FIG. 18C.

It is possible to calculate time differences $\Delta t$ for the synchronization symbols SY1, SY2, and SY3, and the time differences are averaged to more accurately obtain the time difference $\Delta t$.

The symbol discrimination timing correction unit 217 corrects the provisional symbol discrimination timing $g_2$ output from the provisional discrimination timing detection unit 218 with the calculated time difference $\Delta t$ and outputs the corrected timing as the highly accurate symbol discrimination timing $g_1$ to the intrinsic symbol extraction circuit 17.

The intrinsic symbol extraction circuit 17 samples the signal value at the position of each demodulated signal c input from the baseband filter 16, which signal value is designated by the highly accurate corrected symbol discrimination timing $g_1$, thereby outputting the final demodulated symbol d.

In the demodulated signal symbol discrimination timing detection apparatus having the above arrangement, the provisional symbol discrimination timing detection unit 218 for detecting the provisional symbol discrimination timing using the signal b demodulated by the subcarrier separation circuit 13 need not calculate a highly accurate final symbol discrimination timing, but can only calculate the provisional symbol discrimination timing $g_2$.

To obtain a highly accurate symbol discrimination timing using the demodulated signal b, a large amount of arithmetic processing including averaging processing must be performed for a long period of time. When a high accuracy is not so required, the symbol discrimination timing can be calculated by the circuit arrangement in FIG. 15 within a relatively short period of time.

A rough symbol discrimination timing is used as the provisional symbol discrimination timing $g_2$, and the provisional symbol extraction unit 219 obtains the provisional demodulated symbol $d_2$ using this provisional symbol discrimination timing $g_2$. The phase difference $\Delta\theta'$ between the provisional demodulated symbol $d_2$ and the theoretically obtained reference phase $\theta_S$ is obtained. The time difference $\Delta t$ between the provisional symbol discrimination timing $g_2$ and the reference symbol discrimination timing $g_0$ is obtained from the phase difference $\Delta\theta'$ and the subcarrier frequency, thereby correcting the provisional symbol discrimination timing $g_2$.

A time required for detecting the phase difference $\Delta\theta'$ and correcting the provisional symbol discrimination timing $g_2$ can be very short. As a result, a highly accurate symbol discrimination timing can be detected within a short period of time.

In this embodiment, the provisional symbol discrimination timing detection unit 218 detects the provisional symbol discrimination timing $g_2$ using the correlation between the reference amplitude waveform 223 and the amplitude of the demodulated signal b output from the subcarrier separation circuit 13. However, it is generally possible to nonlinearly process the demodulated signal b to extract a specific component, thereby detecting a symbol discrimination timing.

It is also possible to detect the provisional symbol discrimination timing $g_2$ from, e.g., the subcarrier-synthesized signal output from the synchronous detection circuit 12.

In the phase difference detection unit 220, the phase of the provisional demodulated symbol $d_2$ is calculated, and a difference between the provisional demodulated symbol $d_2$ and the reference phase is obtained. It is, for example, possible to obtain phase difference signals $I_P$ and $Q_P$ using the in-phase component I and the quadrature component Q of the provisional demodulated symbol $d_2$, provided that a reference symbol is stored in a memory in the form of an in-phase component $I_S$ and a quadrature component $Q_S$:

$$I_P = I \cdot I_S + Q \cdot Q_S$$

$$Q_P = Q \cdot I_S - I \cdot Q_S$$

The symbol discrimination timing correction unit 217 can directly average the phase difference signals or calculate a phase difference in addition to the techniques as in this embodiment upon virtual replacement of the above phase difference signal.

In this embodiment, the synchronization symbols SY1, SY2, and SY3 are defined as the reference symbols. However, it is, for example, possible to obtain a phase difference using, e.g., data or pilot symbols. The reference symbols are not limited to the synchronization symbols.

In this embodiment, the digital modulation signal demodulation apparatus is arranged to finally output a demodulated symbol. However, using the highly accurate symbol discrimination timing $g_1$ obtained in the present invention, the apparatus of the present invention can be incorporated in a digital signal measurement display apparatus for displaying the accurate timings of slots of modulated signals.

In each circuit of the above embodiment, the demodulation unit constituted by the subcarrier separation circuits 13 and the baseband filters 16, the provisional discrimination timing detection unit 218, the provisional symbol extraction units 219, the phase difference detection units 220, and the symbol discrimination timing correction unit 217 are realized by a software means using computer programs. However, these circuits may be realized by hardware circuits.

As described above, in the digital modulation signal demodulation apparatus according to the sixth embodiment of the present invention, the provisional symbol discrimination timing is calculated from the signal obtained by demodulating the received signal, the provisional demodulated symbol is obtained using this provisional symbol discrimination timing, and the provisional symbol discrimination timing is corrected using the phase difference between the phase of the provisional demodulated symbol and the reference phase.

In the digital modulation signal demodulation apparatus of the present invention, the provisional demodulated symbol need not be accurately detected for a long period of time. A highly accurate symbol discrimination timing can be detected within a short period of time. The demodulation accuracy of the demodulated symbol and the demodulation processing speed in the digital signal demodulation apparatus incorporating this detection apparatus can be greatly increased.

Embodiments included in the fourth mode of the present invention will be described below.

According to the embodiments included in the fourth mode of the present invention, the parts of the above embodiments included in the first to third modes are generalized, or selectively or integrally combined.

The same reference numerals as in the above modes denote the same parts in the fourth mode, and a detailed description will be omitted.

FIG. 19 shows a digital modulation signal demodulation apparatus according to the seventh embodiment obtained by generalizing the embodiments included in the first and second modes.

More specifically, in this digital signal demodulation apparatus according to the seventh embodiment, a subcarrier-synthesized signal from a synchronous detection circuit 12 is supplied to a demodulated symbol output unit 301 constituted by a frequency offset correction circuit 19, complex bandpass filters 26, symbol extraction circuits 17, and symbol rotation circuits 27. The demodulated symbol output unit 301 outputs a demodulated symbol as described above. At the same time, the subcarrier-synthesized signal is supplied to a specific component detection unit 302.

The specific component detection unit 302 has at least one of the functions of the amplitude detection unit 21 and phase detection unit 117. The specific component detection unit 302 detects at least one of the amplitude and phase components as a specific component from the subcarrier-synthesized signal.

A reference specific component storage unit 303 corresponds to the memories 23 and 119. The reference specific component storage unit 303 prestored at least one of reference amplitude and phase components as a reference specific component.

A comparison value calculation unit 304 corresponds to the correlation unit 22, the discrimination timing determination unit 24, the synchronous detection unit 124, the phase difference calculation unit 120, and the offset amount calculation unit 121. The comparison value calculation unit 304 compares at least one of the amplitude and phase components as the specific component from the specific component detection unit 302 with at least one of the reference amplitude and phase components as the reference specific component from the reference specific component storage unit 303. The comparison value calculation unit 304 supplies at least one of a discrimination timing and a frequency offset (correction amount) to the demodulated symbol output unit 301 in accordance with at least one of the amplitude component and the phase component serving as a comparison value.

The demodulated symbol output unit 301, therefore, can output a demodulated symbol c as described above by at least one of correction of the frequency offset and detection of a symbol.

FIG. 20 shows a digital modulation signal demodulation apparatus according to the eighth embodiment obtained by integrally combining the first and second modes.

In the eighth embodiment, a symbol discrimination timing can be used for time synchronization in detecting a phase difference. In addition, it is naturally possible to realize the digital signal demodulation apparatus having functions obtained by integrating the first and second modes.

Figure 21:
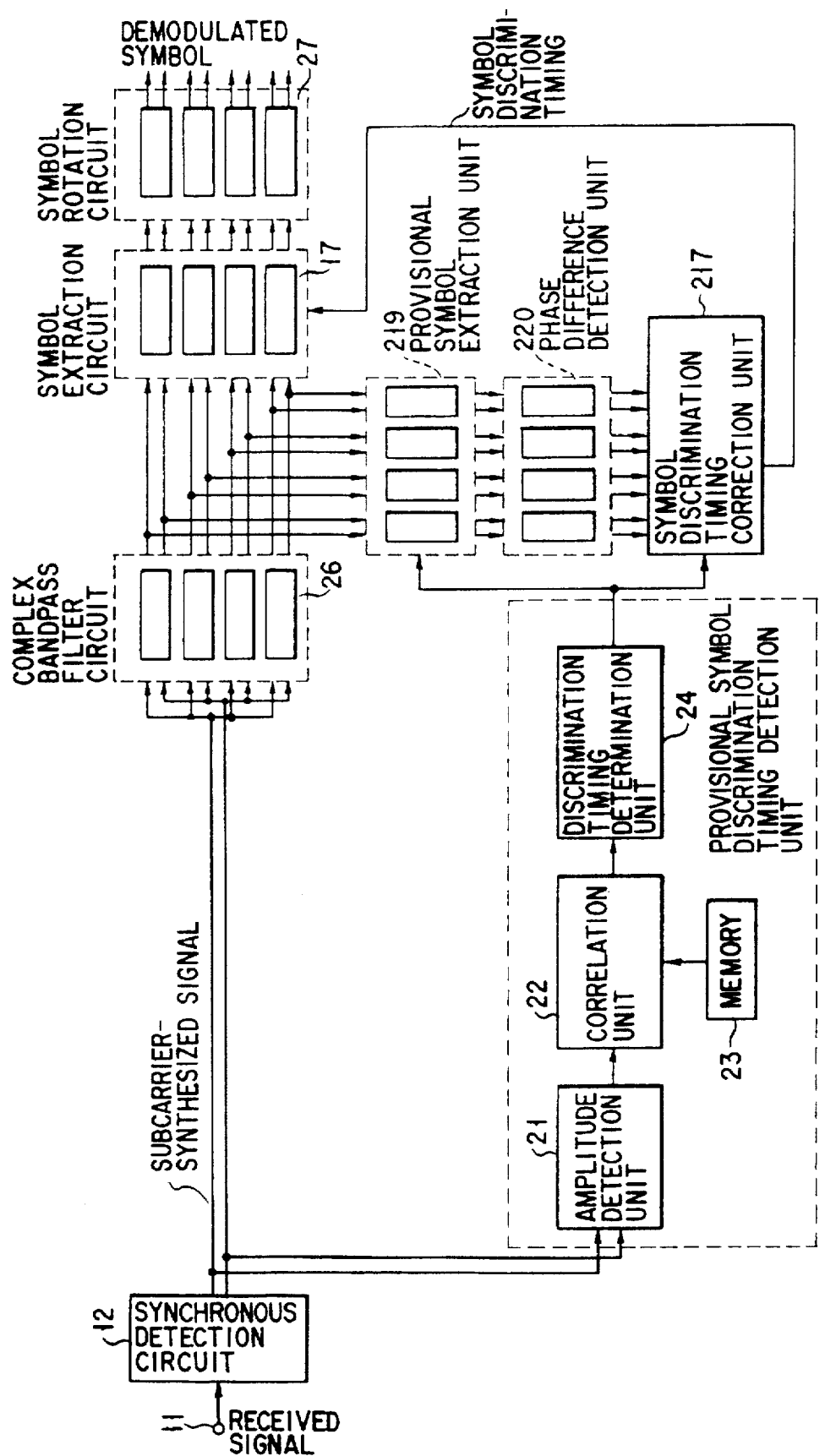
FIG. 21 is a block diagram showing the arrangement of a digital signal demodulation apparatus according to the ninth embodiment of the present invention.

FIG. 21 shows a digital modulation signal demodulation apparatus according to the ninth embodiment obtained by selectively combining part of the first mode, and the third mode.

In the ninth embodiment, it is naturally possible to realize the digital modulation signal demodulation apparatus having functions obtained by selectively combining part of the first mode, and the third mode.

In this embodiment, a symbol need not be rotated in demodulating a provisional symbol because a reference phase is rotated in advance, or the symbol is corrected in calculation of a symbol discrimination timing error.

FIG. 22 shows a digital modulation signal demodulation apparatus according to the 10th embodiment obtained by selectively combining part of the first mode and part of the second mode.

More specifically, in the 10th embodiment, a subcarrier separation circuit need not be incorporated. At the same time, the digital signal demodulation apparatus in which a frequency offset can be properly corrected is realized.

FIG. 23 shows a digital modulation signal demodulation apparatus according to the 11th embodiment obtained by selectively combining part of the second mode and part of the third mode.

More specifically, in the 11th embodiment, the digital modulation signal demodulation apparatus in which a frequency offset can be corrected and a symbol discrimination timing can be accurately determined within a short period of time is realized.

In FIG. 23, an intrinsic symbol discrimination timing detection unit 305 has the functions of the provisional symbol extraction unit 219, the phase difference detection unit 220, and the symbol discrimination timing correction unit 217 shown in FIG. 15. The intrinsic symbol discrimination timing detection unit 305 can accurately output a symbol discrimination timing together with the provisional symbol discrimination timing detection unit 218 within a short period of time, as in the sixth embodiment.

FIG. 24 shows a digital modulation signal demodulation apparatus according to the 12th embodiment obtained by uniformly combining the first, second, and third modes.

In the 12th embodiment, it is naturally possible to realize the digital signal demodulation apparatus having functions obtained by integrating the first, second, and third modes.

Figure 25:
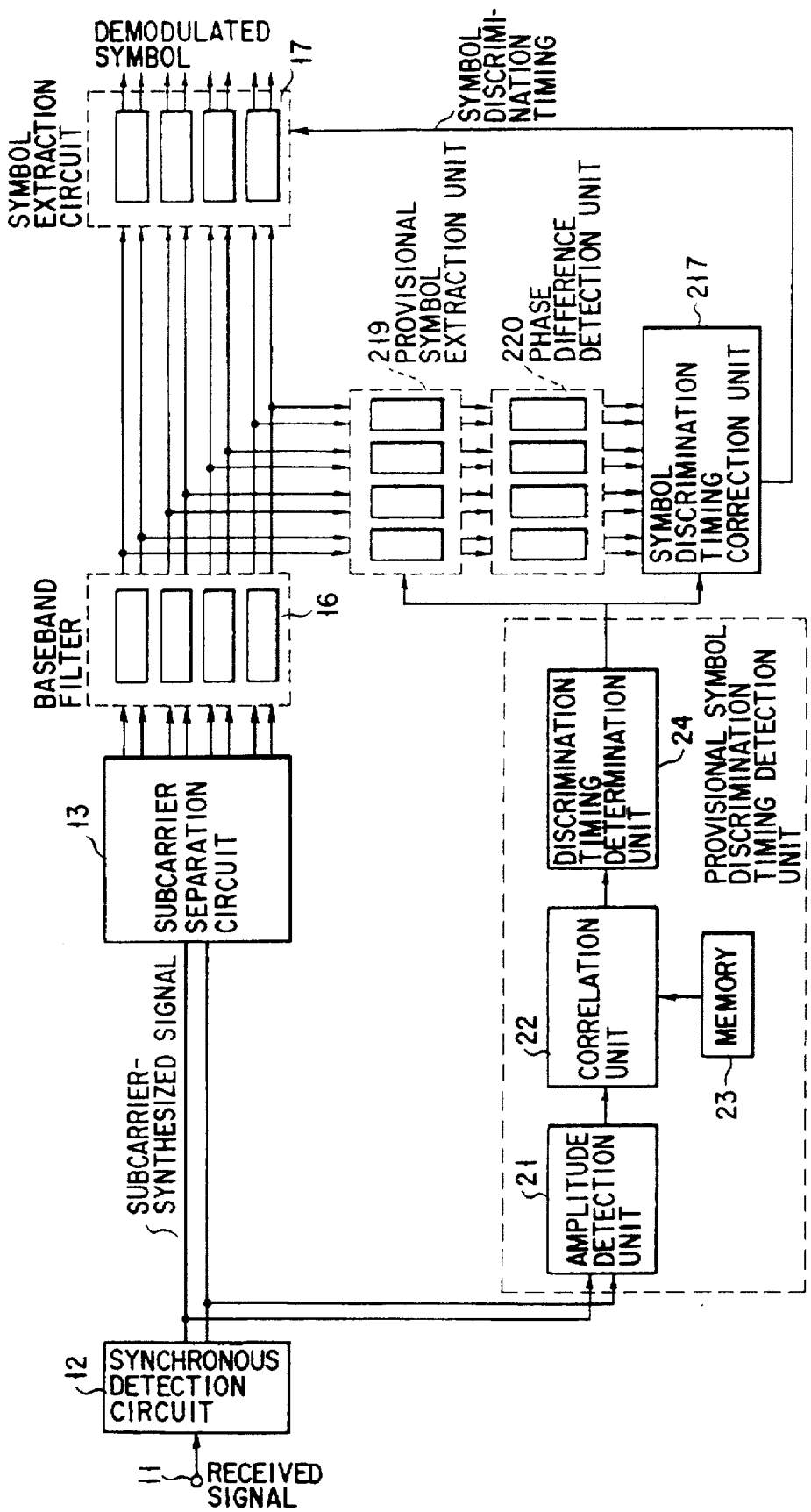
FIG. 25 is a block diagram showing the arrangement of a digital signal demodulation apparatus according to the 13th embodiment of the present invention.

FIG. 25 shows a digital modulation signal demodulation apparatus according to the 13th embodiment obtained by selectively combining part of the first mode, and the third mode.

In the 13th embodiment, a provisional symbol discrimination timing and a symbol discrimination timing can be detected from a short received signal. In addition, it is naturally possible to realize the digital signal demodulation apparatus having functions obtained by selectively combining part of the first mode, and the third mode.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A symbol demodulation apparatus for a digital modulation signal modulated by a multi-subcarrier modulation scheme using a plurality of subcarriers each having a predetermined frequency, said digital modulation signal including a predetermined number of symbols each having a predetermined timing, said apparatus comprising:

demodulation means for demodulating the digital modulation signal to output a subcarrier-synthesized signal;

frequency offset detection means for calculating a frequency offset amount of the digital modulation signal with respect to a detection frequency of said demodulation means in accordance with phase information of the subcarrier-synthesized signal from said demodulation means;

frequency offset correction means for correcting a frequency offset with respect to the subcarrier-synthesized signal from said demodulation means in accordance with the frequency offset amount from said frequency offset detection means;

complex bandpass filter means for performing baseband filter processing to the subcarrier-synthesized signal, for each subcarrier, whose frequency offset is correction by said frequency offset correction means;

provisional symbol discrimination timing detection means for provisionally detecting, in accordance with amplitude information of the subcarrier-synthesized signal from said demodulation means, a provisional symbol discrimination timing for extracting each symbol included in the digital modulation signal;

provisional symbol extraction means for demodulating an output from said complex bandpass filter means for each subcarrier using the provisional symbol discrimination timing from said provisional symbol discrimination timing detection means to extract a provisional symbol;

symbol discrimination timing correction means for correcting the provisional symbol discrimination timing from said provisional symbol discrimination timing detection means in accordance with phase information of the provisional symbol from said provisional symbol extraction means to obtain an intrinsic symbol discrimination timing;

symbol extraction means for extracting an intrinsic symbol from the output of said complex bandpass filter means for each subcarrier using the intrinsic symbol discrimination timing from said symbol discrimination timing correction means; and symbol rotation means for rotating the intrinsic symbol from said symbol extraction means in a direction reverse to a direction of rotation at a corresponding subcarrier frequency so as to substantially stop rotation of the intrinsic symbol, thereby outputting a demodulated symbol.

2. An apparatus according to claim 1, wherein said demodulation means comprises a synchronous detection circuit for quadrature-demodulating the digital modulation signal with the detection frequency to output a subcarrier-synthesized signal consisting of an in-phase component and a quadrature component.

3. An apparatus according to claim 2, wherein said provisional symbol discrimination timing detection means comprises:

an amplitude detection unit for detecting an amplitude of the subcarrier-synthesized signal from said synchronous detection circuit;

a reference signal generation unit for generating a reference signal;

a correlation unit for calculating a correlation value between an amplitude value from said amplitude detection unit and the reference signal from said reference signal generation unit; and a discrimination timing determination unit for detecting sampling time representing a maximum value of correlation values from said correlation unit and determining the provisional symbol discrimination timing on the basis of the sampling time.

4. An apparatus according to claim 3, wherein said reference signal generation unit comprises a memory for prestoring reference amplitude waveforms corresponding to predetermined symbols included in the digital modulation signal as reference symbols, and the reference amplitude waveforms stored in said memory are read out and supplied to said correlation unit.

5. An apparatus according to claim 4, wherein the reference symbols are selected from symbols having eigenvalues.

6. An apparatus according to claim 5, wherein the symbols having the eigenvalues include a synchronization symbol.

7. An apparatus according to claim 2, wherein said frequency offset detection means comprises:

a phase detection unit for detecting a phase, at a predetermined portion, of the subcarrier-synthesized signal from said synchronous detection circuit;

a reference signal generation unit for generating a reference signal;

a phase difference calculation unit for calculating a phase difference between the phase detected by said phase detection unit and the reference signal generated by said reference signal generation unit; and an offset amount calculation unit for calculating the frequency offset amount from the phase difference calculated by said phase difference calculation unit.

8. An apparatus according to claim 7, wherein said reference signal generation unit comprises a memory for prestoring a reference phase corresponding to the predetermined portion of the subcarrier-synthesized signal.

9. A digital modulation signal demodulation apparatus comprising:
 specific component detection means for sequentially detecting specific components of a subcarrier-synthesized signal obtained by modulating reference symbols having a predetermined data form using a multi-subcarrier modulation scheme;
 reference specific component storage means for prestoring reference specific components corresponding to the reference symbols;
 comparison value calculation means for comparing the specific components sequentially detected by said specific component detection means with the reference specific components stored in said reference specific component storage means; and
 demodulated symbol output means for outputting signal values for each subcarrier as demodulated symbols using comparison values sequentially calculated by said comparison value calculation means.

10. An apparatus according to claim 9, further comprising means for determining a symbol discrimination timing on the basis of time representing a maximum correlation value when the specific components are amplitudes, and the comparison values are correlation values.

11. A digital modulation signal demodulation apparatus comprising:
 amplitude detection means for sequentially detecting amplitudes as specific components of a subcarrier-synthesized signal obtained by modulating reference symbols having a predetermined data form using a multi-subcarrier modulation scheme;
 reference amplitude storage means for prestoring reference amplitudes corresponding to the reference symbols;
 correlation calculation means for sequentially calculating correlation values as comparison values between the amplitudes sequentially detected by said amplitude detection means and the reference amplitudes stored in said reference amplitude storage means;
 discrimination timing determination means for determining a symbol discrimination timing on the basis of time representing a maximum value of the correlation values sequentially calculated by said correlation calculation means; and
 demodulated symbol output means for outputting, as demodulated symbols, signal values at the symbol discrimination timing for each subcarrier.

12. An apparatus according to claim 9, wherein the reference symbols are selected from symbols having eigenvalues.

13. An apparatus according to claim 12, wherein the symbols having the eigenvalues include a synchronization symbol.

14. An apparatus according to claim 9, wherein said demodulated symbol output means comprises a complex bandpass filer having a center frequency set at a frequency of each subcarrier, and a symbol rotation circuit for stopping rotation of a complex received symbol to output a demodulated symbol.

15. An apparatus according to claim 9, further comprising:
 offset amount calculation means for, when the specific components are phases, and the comparison values are phase differences, calculating a frequency offset amount on the basis of the phase differences; and
 frequency offset correction means for correcting an offset amount of a frequency included in the subcarrier-synthesized signal using the calculated offset amount.

16. A digital modulation signal demodulation apparatus comprising:
 phase detection means for detecting phases of a subcarrier-synthesized signal obtained by modulating reference symbols having a predetermined data form using a multi-subcarrier modulation scheme;
 reference phase storage means for prestoring reference phases corresponding to the reference symbols;
 phase difference calculation means for calculating phase differences between the phases detected by said phase detection means and the reference phases stored in said reference phase storage means;
 offset amount calculation means for calculating a frequency offset amount on the basis of the phase differences calculated by said phase difference calculation means; and
 demodulated symbol output means having frequency offset correction means for correcting a frequency offset amount included in the subcarrier-synthesized signal using the frequency offset amount calculated by said offset amount calculation means.

17. An apparatus according to claim 11, wherein said demodulated symbol output means comprises:
 phase detection means for detecting phases of the subcarrier-synthesized signal obtained by modulating reference symbols having the predetermined data form using a multi-subcarrier modulation scheme;
 reference phase storage means for prestoring reference phases corresponding to the reference symbols;
 phase difference calculation means for calculating phase differences between the phases detected by said phase detection means and the reference phases;
 offset amount calculation means for calculating a frequency offset amount on the basis of the phase differences calculated by said phase calculation means; and
 frequency offset correction means for correcting an offset amount of a frequency included in the subcarrier-synthesized signal using the calculated offset amount.

18. A digital modulation signal demodulation apparatus for outputting, as demodulated symbols, signal values at a symbol discrimination timing for each subcarrier from a subcarrier-synthesized signal serving as a received signal modulated by a multi-subcarrier modulation scheme, comprising:
 amplitude detection means for sequentially detecting amplitudes of the subcarrier-synthesized signal;
 reference amplitude storage means for prestoring a reference amplitude corresponding to a predetermined reference symbol portion included in the received signal;
 correlation calculation means for sequentially calculating correlation values between the amplitudes sequentially detected by said amplitude detection means and the reference amplitude stored in said reference amplitude storage means;
 discrimination timing determination means for determining a provisional symbol discrimination timing on the basis of time representing a maximum value of the correlation values sequentially calculated by said correlation calculation means;

provisional symbol demodulation means for demodulating the received signal for each subcarrier to output provisional demodulated symbols using the provisional symbol discrimination timing output from said discrimination timing determination means;

phase difference detection means for detecting phase differences between phases of the provisional demodulated symbols, at a predetermined position, of the received signal output from said provisional symbol demodulation means and reference phases of reference symbols at the predetermined position; and symbol discrimination timing correction means for calculating a time difference of the provisional symbol discrimination timing from a reference symbol discrimination timing on the basis of the phase differences, for each subcarrier, detected by said phase difference detection means and frequencies of the subcarriers, and correcting the provisional symbol discrimination timing on the basis of the time difference.

19. A digital modulation signal demodulation apparatus for obtaining demodulated signals for each subcarrier from a subcarrier-synthesized signal serving as a received signal modulated by a multi-subcarrier modulation scheme, comprising:

phase detection means for detecting a phase of the subcarrier-synthesized signal at a predetermined portion;

reference phase storage means for prestoring a reference phase corresponding to the phase of the subcarrier-synthesized signal at the predetermined portion;

phase difference calculation means for calculating a phase difference between the phase detected by said phase detection means and the reference phase stored in said reference phase storage means;

offset amount calculation means for calculating a frequency offset amount from the phase difference calculated by said phase difference calculation means;

frequency offset correction means for correcting a frequency offset amount included in the subcarrier-synthesized signal using the frequency offset amount calculated by said offset amount calculation means;

a plurality of complex bandpass filters, each having a passing center frequency set at a corresponding subcarrier frequency, each for receiving an output whose frequency offset is corrected by said frequency offset correction means and performing complex bandpass filter processing to the received signal to obtain a complex received symbol which rotates on a complex coordinate system; and a plurality of symbol rotation means each for reversely rotating the complex received symbol obtained by each complex bandpass filter and stopping rotation of the complex received symbol to output a demodulated symbol.

20. A digital modulation signal demodulation apparatus comprising:

a plurality of complex bandpass filters, each having a passing center frequency set at a corresponding subcarrier frequency, each for receiving a received signal modulated by a multi-subcarrier modulation scheme and performing complex bandpass filter processing to the received signal to obtain a complex received symbol which rotates on a complex coordinate system;

provisional symbol discrimination timing detection means for detecting a provisional symbol discrimination timing of the received signal modulated by the multi-subcarrier modulation scheme;

provisional symbol demodulation means for demodulating an output from each of said plurality of bandpass filters for each subcarrier and outputting the demodulated output as a provisional demodulated symbol using the provisional symbol discrimination timing output from said provisional symbol discrimination timing detection means;

phase difference detection means for detecting a phase difference between a phase of the provisional demodulated symbol, at a predetermined position of the received signal, output from said provisional symbol demodulation means and a reference phase of the reference symbol at the predetermined position;

symbol discrimination timing correction means for obtaining a time difference of the provisional symbol discrimination timing from a reference symbol discrimination timing on the basis of the phase difference detected for each subcarrier by said phase difference detection means and a frequency of the subcarrier, and correcting the provisional symbol discrimination timing on the basis of the time difference;

symbol extraction means for demodulating the output from each of said plurality of complex bandpass filters for each subcarrier using a symbol discrimination timing obtained by correcting the provisional symbol discrimination timing by said symbol discrimination timing correction means to extract a symbol; and a plurality of symbol rotation means each for rotating the symbol extracted by said symbol extraction means in a direction reverse to a direction of rotation at the corresponding subcarrier frequency so as to stop rotation of the symbol, thereby outputting demodulated symbol including an in-phase component and a quadrature component.

21. A digital modulation signal demodulation apparatus for obtaining demodulated signals for each subcarrier from a subcarrier-synthesized signal serving as a received signal modulated by a multi-subcarrier modulation scheme, comprising:

phase detection means for detecting a phase of the subcarrier-synthesized signal at a predetermined portion;

reference phase storage means for prestoring a reference phase identical to the phase of the subcarrier-synthesized signal at the predetermined portion;

phase difference calculation means for calculating a phase difference between the phase detected by said phase detection means and the reference phase stored in said reference phase storage means;

offset amount calculation means for calculating a frequency offset amount from the phase difference calculated by said phase difference calculation means;

frequency offset correction means for correcting a frequency offset amount included in the subcarrier-synthesized signal using the frequency offset amount calculated by said offset amount calculation means;

provisional symbol discrimination timing detection means for detecting a provisional symbol discrimination timing of the received signal whose frequency offset is corrected by said frequency offset correction means;

provisional symbol demodulation means for demodulating the received signal for each subcarrier and outputting a demodulated received signal as a provisional demodulated symbol using the provisional symbol discrimination timing output from said provisional symbol discrimination timing detection means;

phase difference detection means for detecting a phase difference between a phase of the provisional demodulated symbol, at a predetermined position of the received signal, output from said provisional symbol demodulation means and a reference phase of a reference symbol at the predetermined position;

symbol discrimination timing correction means for obtaining a time difference of the provisional symbol discrimination timing from a reference symbol discrimination timing on the basis of the phase difference detected for each subcarrier detected by said phase difference detection means and a frequency of the subcarrier, and correcting the provisional symbol discrimination timing on the basis of the time difference; and symbol extraction means for demodulating the received signal for each subcarrier using a symbol discrimination timing obtained by correcting the provisional symbol discrimination timing by said symbol discrimination timing correction means to extract a symbol.

* * * * *